(12) United States Patent
Schreyer et al.

(10) Patent No.: US 11,623,868 B2
(45) Date of Patent: Apr. 11, 2023

(54) PROCESS FOR A CONTINUOUS SYNTHESIS OF ZEOLITIC MATERIALS USING SEED CRYSTALS LOADED WITH ORGANOTEMPLATE

(71) Applicant: BASF SE, Ludwigshafen am Rhein (DE)

(72) Inventors: Hannah Schreyer, Ludwigshafen (DE); Andrei-Nicolae Parvulescu, Ludwigshafen (DE); Ulrich Mueller, Ludwigshafen (DE); Christian Riemann, Ludwigshafen (DE); Ralf Boehling, Ludwigshafen (DE); Christoph Schappert, Ludwigshafen (DE); Bernd Hinrichsen, Ludwigshafen (DE); Stefan Dumser, Ludwigshafen (DE); Stefanie Clade, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 100 days.

(21) Appl. No.: 17/250,534

(22) PCT Filed: Aug. 2, 2019

(86) PCT No.: PCT/EP2019/070908
§ 371 (c)(1),
(2) Date: Feb. 1, 2021

(87) PCT Pub. No.: WO2020/025799
PCT Pub. Date: Feb. 6, 2020

(65) Prior Publication Data
US 2021/0300772 A1 Sep. 30, 2021

(30) Foreign Application Priority Data
Aug. 2, 2018 (EP) ........................ 8186982

(51) Int. Cl.
| | | |
|---|---|---|
| *B01J 29/76* | (2006.01) | |
| *C01B 39/48* | (2006.01) | |
| *B01D 53/86* | (2006.01) | |
| *B01D 53/94* | (2006.01) | |
| *B01J 37/00* | (2006.01) | |
| *B01J 37/04* | (2006.01) | |
| *B01J 37/06* | (2006.01) | |
| *B01J 37/10* | (2006.01) | |
| *B01J 37/30* | (2006.01) | |
| *B01J 39/02* | (2006.01) | |
| *B01J 39/14* | (2006.01) | |

(52) U.S. Cl.
CPC .......... *C01B 39/48* (2013.01); *B01D 53/8628* (2013.01); *B01D 53/9418* (2013.01); *B01J 29/763* (2013.01); *B01J 37/0018* (2013.01); *B01J 37/04* (2013.01); *B01J 37/06* (2013.01); *B01J 37/10* (2013.01); *B01J 37/30* (2013.01); *B01J 39/02* (2013.01); *B01J 39/14* (2013.01); *B01D 2255/50* (2013.01); *B01J 2229/186* (2013.01); *C01P 2002/72* (2013.01); *C01P 2004/03* (2013.01)

(58) Field of Classification Search
None
See application file for complete search history.

(56) References Cited

U.S. PATENT DOCUMENTS

| | | | |
|---|---|---|---|
| 4,368,174 A * | 1/1983 | Valyocsik | C01B 39/02 366/279 |
| 5,100,636 A | 3/1992 | Thome et al. | |
| 5,989,518 A | 11/1999 | Tannous et al. | |
| 2001/0054549 A1 | 12/2001 | Park et al. | |
| 2014/0112854 A1* | 4/2014 | Mohanan | B01J 29/76 422/180 |
| 2015/0151286 A1* | 6/2015 | Rivas-Cardona | B01D 53/9418 423/703 |
| 2016/0115039 A1 | 4/2016 | Okubo et al. | |

FOREIGN PATENT DOCUMENTS

| | | |
|---|---|---|
| DE | 39 19 400 A1 | 1/1991 |
| EP | 3020688 A1 | 5/2016 |

(Continued)

OTHER PUBLICATIONS

Liu, Zhengdoing, et al. "Widening Synthesis Bottlenecks . . . ". Zeolite Syntehsis. Angewandt Chem. Int. Ed. 54. 5683-5687 (2015). (Year: 2015).*
Vandermeersch, T. et al. A continuous flow reactor setup as a tool for rapid synthesis of micron sized NaA zeolite in Microporous and Mesoporous Materials 2016, 226, 133-139.
Ju, J. et al., Continuous synthesis of zeolite NaA in a microchannel reactor in Chemical Engineering Journal 2006, 116, 115-121.
Hoang, P.H. et al. Ultrafast and Continuous Synthesis of Unaccommodating Inorganic Nanomaterials in Droplet- and Ionic Liquid-Assisted Microfluidic System in J. Am. Chem. Soc. 2011, 133, 14765-14770.

(Continued)

*Primary Examiner* — Sheng H Davis
(74) *Attorney, Agent, or Firm* — DLA Piper LLP (US)

(57) ABSTRACT

Disclosed herein is a continuous process for preparing zeolitic material with a CHA-type framework structure comprising $SiO_2$ and $X_2O_3$ and the zeolitic material so-obtained. The processes comprises (i) preparing a mixture comprising one or more sources of $SiO_2$, one or more sources of $X_2O_3$, seed crystals, one or more tetraalkylammonium cation $R^5R^6R^7R^8N_+$-containing compounds as structure directing agent, and a liquid solvent system; (ii) continuously feeding the mixture prepared in (i) into a continuous flow reactor at a liquid hourly space velocity; and (iii) crystallizing the zeolitic material with a CHA-type framework structure from the mixture in the continuous flow reactor.

12 Claims, 11 Drawing Sheets

(56) References Cited

FOREIGN PATENT DOCUMENTS

| KR | 20170013989 | * | 7/2017 |
|----|----|----|----|
| KR | 2017088886 | * | 8/2017 |
| WO | 9902483 | * | 1/1999 |
| WO | 03020641 | * | 3/2003 |
| WO | WO 2009141324 A1 | | 11/2009 |
| WO | 2010054034 | * | 5/2010 |
| WO | WO 2017100384 A1 | | 6/2017 |
| WO | WO 2017216236 A1 | | 12/2017 |

OTHER PUBLICATIONS

Liu et al. Widening Synthesis Bottlenecks: Realization of Ultrafast and Continuous-Flow Synthesis of High-Silica Zeolite SSZ-13 for NOx Removal in Angewandte. Chem. Int Ed. 2015, 54, 5683-5687.

Liu, Z. et al. Ultrafast Continuous-Flow Synthesis of Crystalline Microporous Aluminophosphate $AlPO_4$-5 in Chemistry of Materials 2014, 26, 2327-2331.

Bonaccorsi, L. et al. Influence of process parameters in microwave continuous synthesis of zeolite LTA in Microporous and Mesoporous Materials 2008, 112, 481-493.

International Search Report for International Application No. PCT/EP2019/070908 dated Sep. 12, 2019 (3 pages).

Nightingale et al., "Large-scale synthesis of nanocrystals in a multichannel droplet reactor," Journal of Materials Chemistry A, vol. 1, No. 12 dated Feb. 5, 2013, p. 4067.

Slangen et al. "Continuous Synthesis of Zeolites using a Tubular Reactor", $12^{th}$ International Zeolite Conference, Materials Research Society 1999, 1553-60.

* cited by examiner

Fig. 3
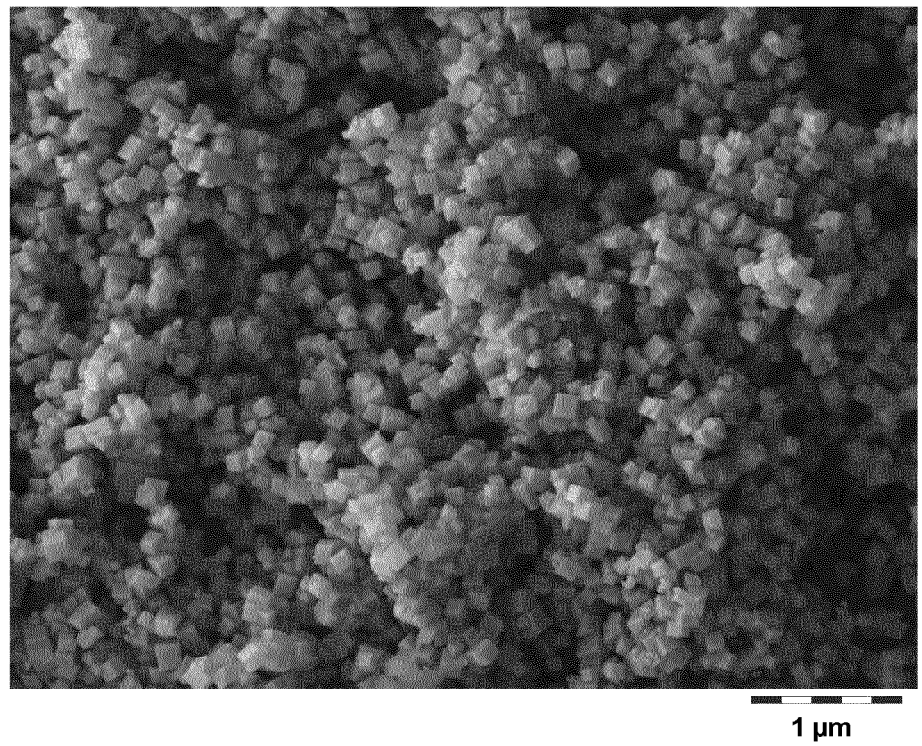
5
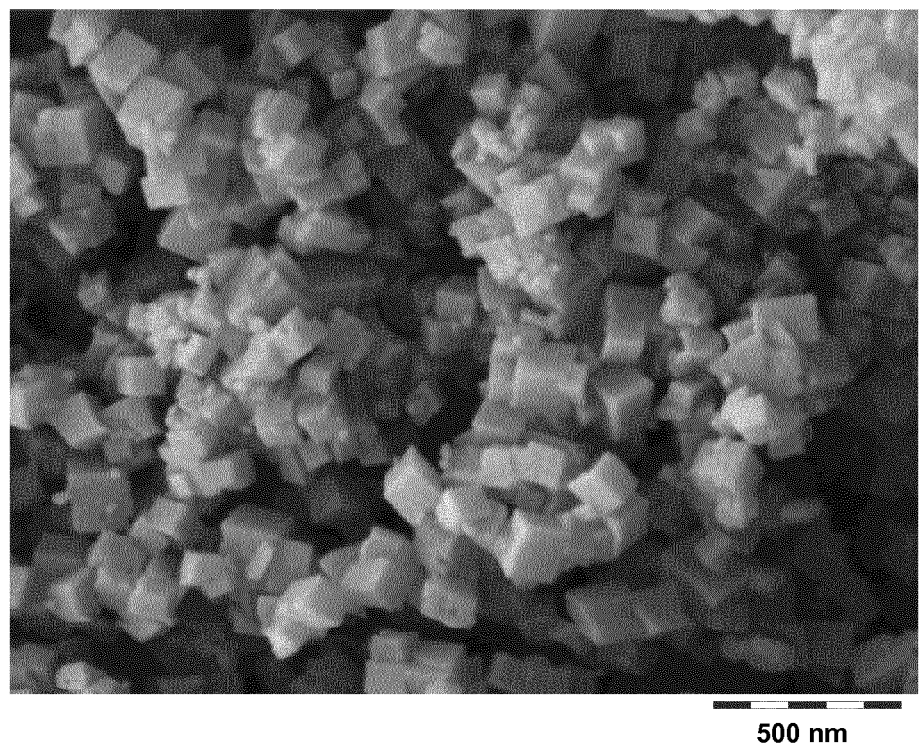

Fig. 4
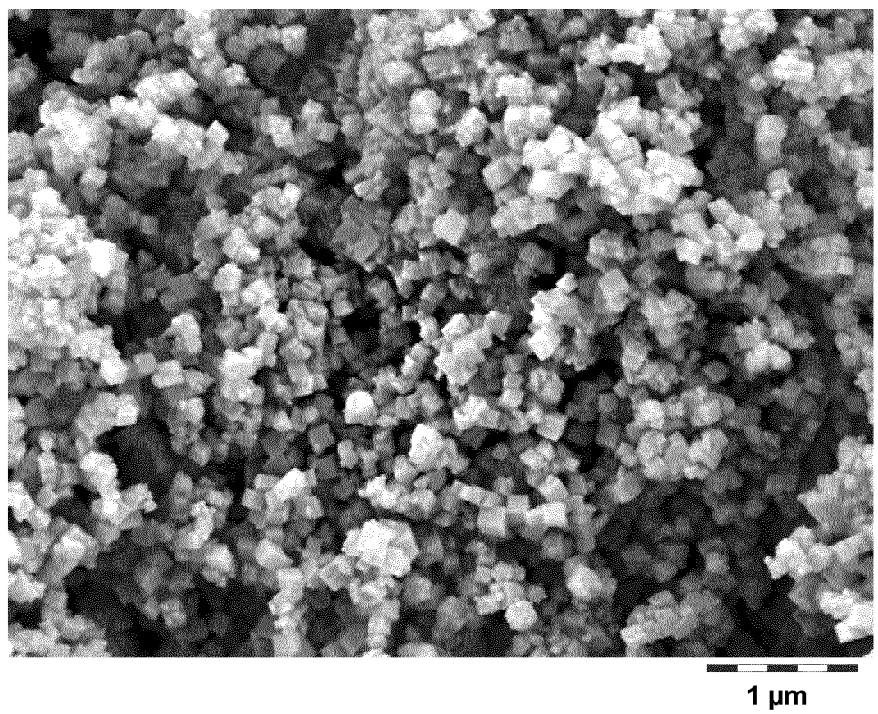
1 µm
5
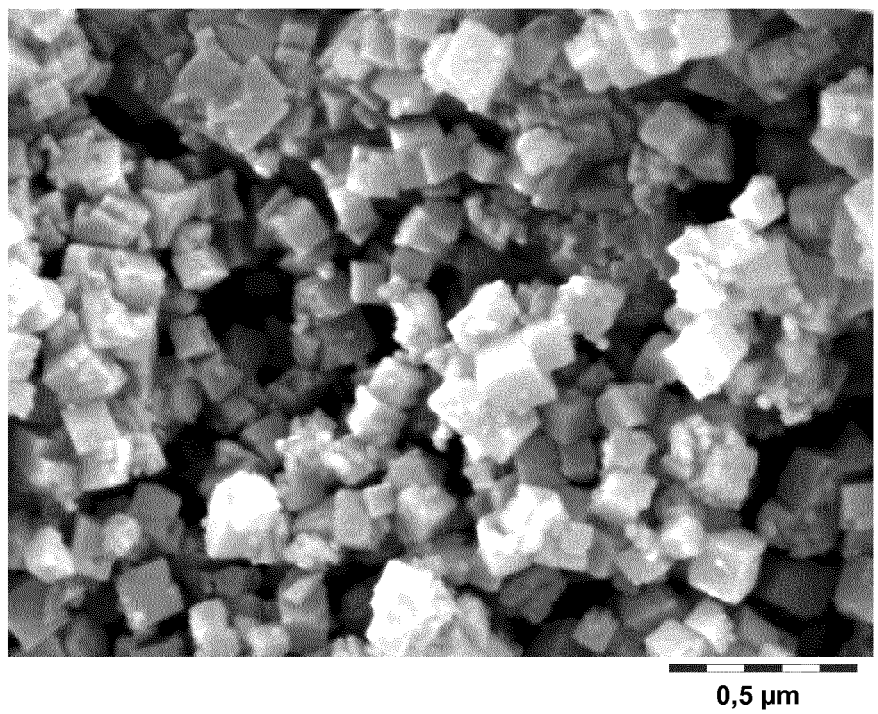
0,5 µm

Example 3 + 3.3%CuO

Fig. 7
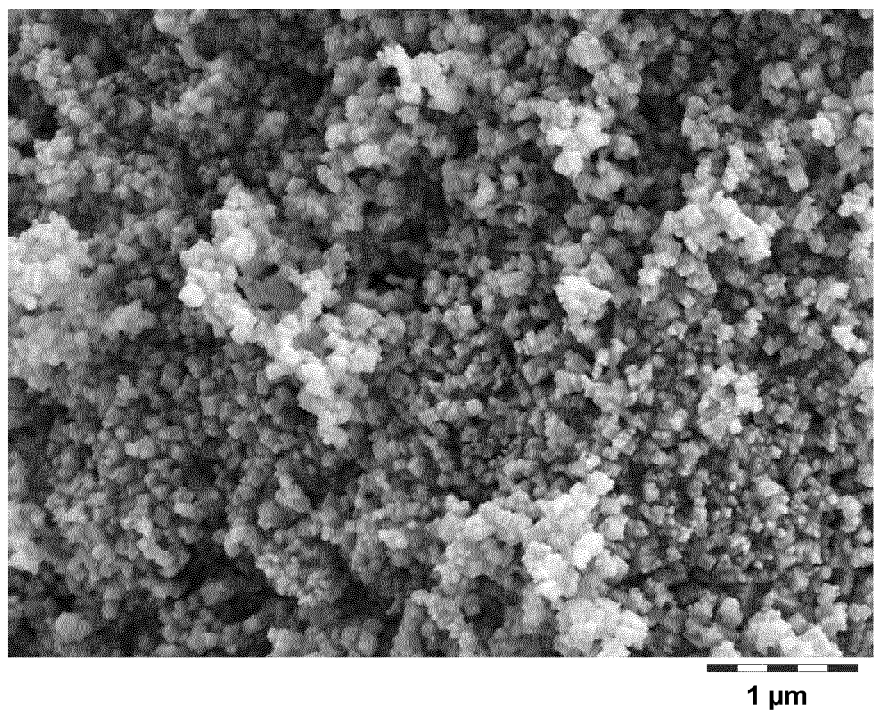
1 µm
5
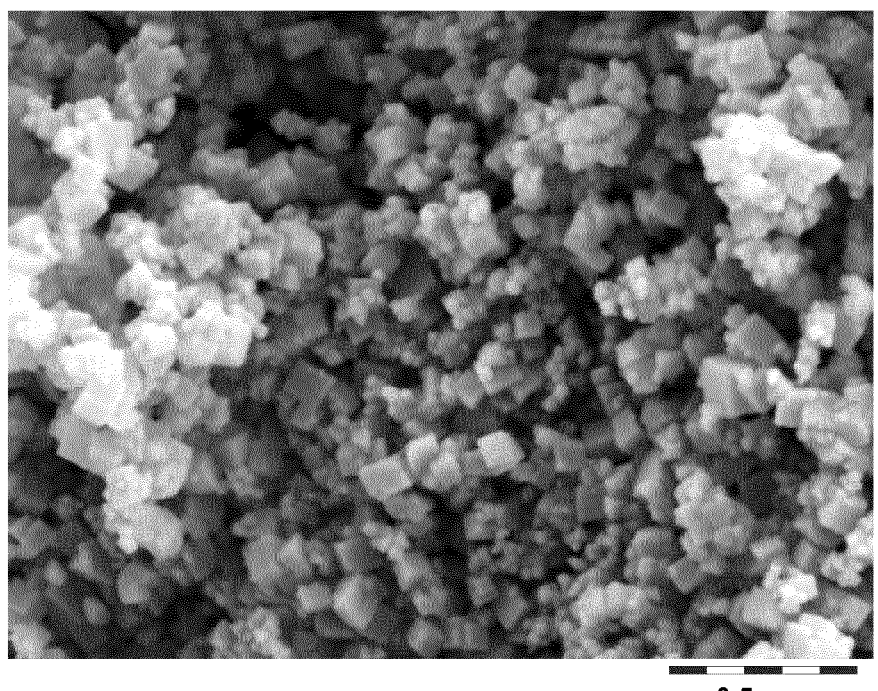
0,5 µm

Fig. 9
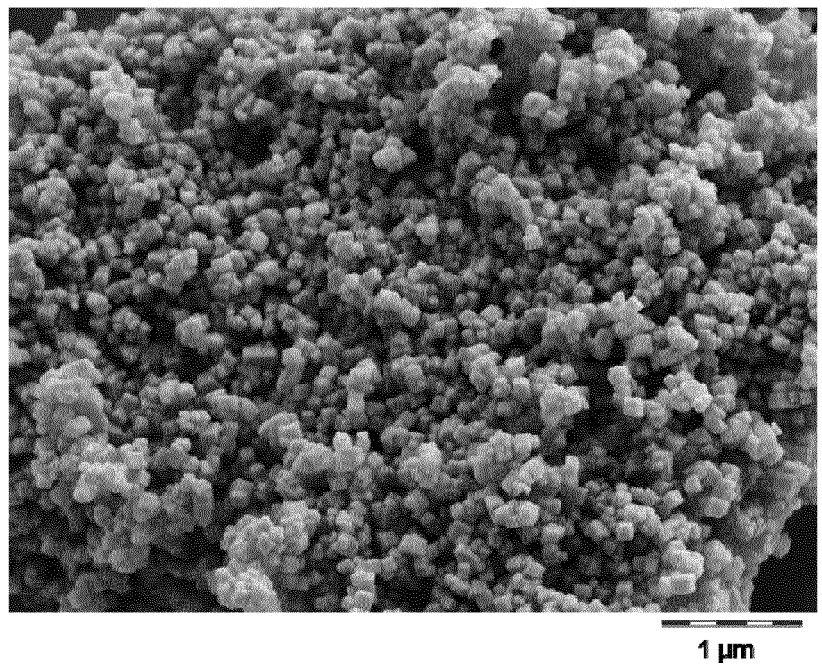
5
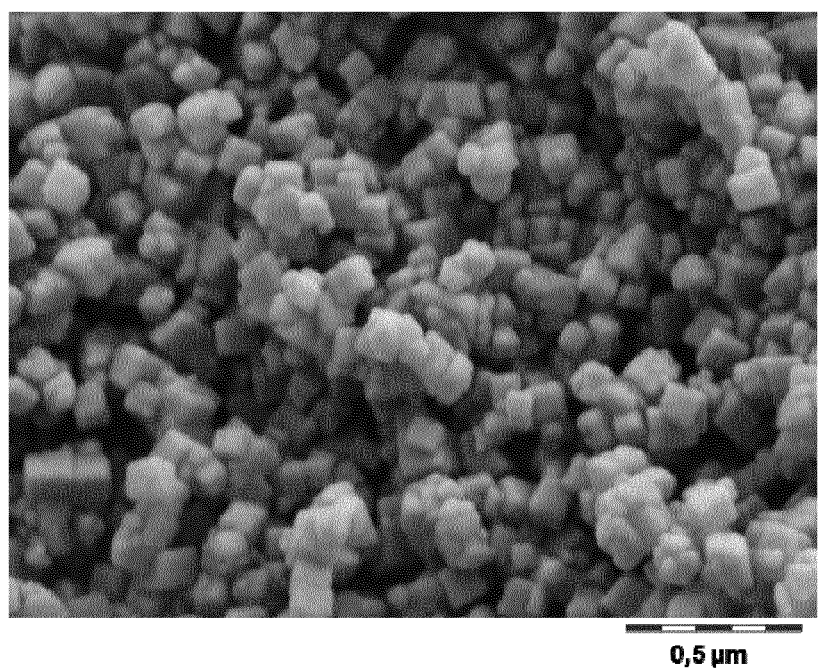

PROCESS FOR A CONTINUOUS SYNTHESIS OF ZEOLITIC MATERIALS USING SEED CRYSTALS LOADED WITH ORGANOTEMPLATE

This application is a U.S. national phase entry application under 35 U.S.C. § 371 from PCT International Application No. PCT/EP2019/070908, filed Aug. 2, 2019, which claims priority to European Patent Application No. 18186982.7, filed Aug. 2, 2018; the contents of each application is incorporated herein by reference in its entirety.

TECHNICAL FIELD

The present invention relates to a continuous process for the preparation of a zeolitic material, as well as to a catalyst per se as obtainable or obtained according to said process. Furthermore, the present invention relates to the use of the inventive zeolitic material, in particular as a catalyst.

INTRODUCTION

The synthesis of zeolitic materials from simple starting compounds and involves a complex process of self organization which often necessitates special conditions such as elevated temperatures and/or pressure, wherein such reactions typically require the heating of starting materials under autogenous pressure for obtaining the zeolitic material after lengthy reaction times ranging from days to several weeks. Accordingly, due to the often harsh reaction conditions and the long reaction times, batch synthesis has long been the method of choice for synthesizing zeolitic materials. Batch reactions however present numerous limitations, in particular relative to the levels of space-time-yield which may be attained.

Efforts have accordingly been invested in finding improved batch reaction procedures as well as alternative methodologies which offer advantages to the classical batch synthetic procedures employed for the synthesis of zeolitic materials. One method which has been investigated in this respect involves the use of continuous stirred-tank reactors wherein the fluid reagents are continuously introduced at the top of a tank reactor, and the effluent containing the solid reaction product is continuously removed from the bottom of the tank reactor. Although said methodologies eliminate the need to empty the reaction vessel between batch runs under non-continuous conditions, the reaction times necessary for crystallization remain lengthy.

For increasing the efficiency of continuous stirred-tank reactors, these are often employed in series, wherein each stage contributes to a given incremental progress of the reaction to completion. The more stages which are employed, the higher the efficiency which may be attained, maximum efficiency being theoretically realized by an infinite number of infinitely small reaction stages. Besides in continuous stirred-tank reactors, the concept of multiple stages has also been realized e.g. in multiple stage cylindrical reactors such as disclosed in U.S. Pat. No. 5,989,518 for the synthesis of a 4A zeolite.

Along these lines, reactor geometries have been conceived which allow for a rapid synthesis of zeolitic materials. Thus, US 2016/0115039 A1 relates to a method for the continuous production of a zeolite in a tubular reactor displaying a low ratio of the volume to the lateral surface area.

Similarly, Liu et al. in Angew. Chem. Int. Ed. 2015, 54, 5683-5687 discloses a continuous synthesis of high-silica zeolite SSZ-13 employing very short reaction times. Ju, J. et al. in Chemical Engineering Journal 2006, 116, 115-121 as well as Vandermeersch, T. et al. in Microporous and Mesoporous Materials 2016, 226, 133-139, on the other hand, respectively disclose the rapid synthesis of micron sized NaA zeolite in a continuous flow reactor setup. Liu, Z. et al. in Chemistry of Materials 2014, 26, 2327-2331 concerns an ultrafast continuous-flow synthesis of crystalline microporous aluminophophate $AlPO_{4-5}$. Slangen et al. "Continuous Synthesis of Zeolites using a Tubular Reactor", 12th International Zeolite Conference, Materials Research Society 1999 relates to the continuous syntheses of NaA zeolite, NaY zeolite, and silicalite-1 in a tubular reactor of 6 mm outer diameter (~3 mm inner diameter) and variable length.

For reactions which do not necessitate high pressure, microwave-assisted procedures have been investigated such as Bonaccorsi, L. et al. in Microporous and Mesoporous Materials 2008, 112, 481-493 which relates to the continuous synthesis of zeolite LTA. Similarly, US 2001/0054549 A1 concerns a continuous process and apparatus for preparing inorganic materials employing microwaves.

Although considerable progress has been made relative to the reaction efficiency in view of the use of continuous stirred-tank and multiple stage reactors, progress made in view of the reduction of the reaction times has been limited to reactor geometries applied on a lab-scale level.

Furthermore, although in principle continuous, efforts made with respect to the reduction of reaction times remain limited with respect to economically viable durations of operation due to the clogging of the reactor, in particular in applications employing plug flow methodologies.

In this respect, DE 39 19 400 A1 describes a hydrothermal pre-treatment of a batch reaction mixture in a tubular reactor prior to crystallization thereof in a batch reactor for at least 40 h reaction time at ambient pressure on an industrial scale. More importantly, however, WO 2017/216236 A1 relates to a continuous process for preparing a zeolitic material comprising continuously feeding a reaction mixture into a continuous flow reactor within a specific range of liquid hourly space velocities and crystallizing the zeolitic material from the mixture in a continuous flow reactor of specific dimensions.

Hoang, P. H. et al. in J. Am. Chem. Soc. 2011, 133, 14765-14770, on the other hand, relates to the continuous synthesis of inorganic nanomaterials in a droplet- and ionic liquid-assisted micro-fluidic synthesis method, wherein ZSM-5 zeolite is synthesized as an example. Furthermore, said document describes the use of a fluorocarbon oil as the continuous phase in a perfluoroalkoxyalkane tube reactor. Nightingale, A. M. et al. in J. Mater. Chem. A, 2013, 1, 4067-4076 on the other hand, describes the synthesis of nanocrystals in a multichannel droplet reactor, wherein octadecene droplets containing the crystallization mixture are contained in a perfluorinated polyether carrier fluid, the two phase system being continuously reacted in a polytetrafluoroethylene capillary reactor.

WO 2017/100384 A1 describes a process for the preparation of a zeolitic material having a CHA-type framework structure comprising $YO_2$ and $X_2O_3$, wherein said process comprises the steps of: (1) providing a mixture comprising one or more sources for $YO_2$, one or more sources for $X_2O_3$, one or more optionally substituted ethyltrimethylammonium cation-containing compounds, and one or more tetraalkylammonium cation $R_1R_2R_3R_4N^+$-containing compounds as structure directing agent; (2) crystallizing the mixture obtained in step (1); wherein $R_1$, $R_2$, and $R_3$ independently from one another stand for alkyl, wherein $R_4$ stands for cycloalkyl.

WO 2009/141324 A1 relates to a process for the preparation of a copper containing zeolitic material having CHA framework structure and a composition comprising the molar ratio (n $YO_2$):$X_2O_3$ wherein X is a trivalent element, Y is a tetravalent element, the process comprising the preparation of an phosphor-free aqueous solution containing at least one source for $X_2O_3$ and at least one source for $YO_2$, at least one structure directing agent, and at least one Cu source.

There however remains the need to improve continuous processes wherein the cost-effectiveness of the procedure may be further optimized by employing organotemplates which may be obtained from a facile and cost-effective synthetic procedure. Furthermore, and in addition thereto, there remains the need to improve continuous processes of zeolitic materials such that crystallization takes place within a flow reactor without being limited to short operation periods in view of clogging issues.

DETAILED DESCRIPTION

It was therefore an object of the present invention to provide an improved continuous process for preparing a zeolitic material which allows for extended periods of uninterrupted operation, in particular on an industrial scale. Thus, it has surprisingly been found that by employing zeolitic materials as seed crystals in the continuous synthesis of a zeolitic material, wherein the zeolitic material of the seed crystals contains cationic organotemplates at the ion exchange sites, the problem of clogging in the continuous synthesis of zeolitic materials having a CHA-type framework structure using specific cycloalkylammonium containing compounds as cost-effective organotemplates may be effectively alleviated.

Therefore, the present invention relates to a continuous process for preparing a zeolitic material having a CHA-type framework structure comprising $SiO_2$ and $X_2O_3$, said process comprising (i) preparing a mixture comprising one or more sources of $SiO_2$, one or more sources of $X_2O_3$, seed crystals, one or more tetraalkylammonium cation $R^5R^6R^7R^8N^+$-containing compounds as structure directing agent, and a liquid solvent system;

(ii) continuously feeding the mixture prepared in (i) into a continuous flow reactor at a liquid hourly space velocity in the range of from 0.3 to 20 $h^{-1}$ for a duration of at least 1 h; and (iii) crystallizing the zeolitic material having a CHA-type framework structure from the mixture in the continuous flow reactor, wherein the mixture is heated to a temperature in the range of from 100 to 300° C.; wherein the volume of the continuous flow reactor is in the range of from 50 $cm^3$ to 75 $m^3$;

wherein the seed crystals comprise one or more zeolitic materials containing one or more cationic organotemplates as counter-ions at the ion exchange sites of the framework structure;

wherein X is a trivalent element, wherein $R^5$, $R^6$, and $R^7$ independently from one another stand for alkyl, and wherein $R^8$ stands for cycloalkyl.

As regards the one or more tetraalkylammonium cation $R^5R^6R^7R^8N^+$-containing compounds as structure directing agent, no particular restriction applies such that any tetraalkylammonium cation $R^5R^6R^7R^8N^+$-containing compound can be used provided that it is suitable as structure directing agent and that $R^5$, $R^6$, and $R^7$ independently from one another stand for alkyl, and wherein $R^8$ stands for cycloalkyl. It is preferred that $R^5$, $R^6$, and $R^7$ independently from one another stand for linear or branched ($C_1$-$C_6$)alkyl, more preferably linear or branched ($C_1$-$C_5$)alkyl, more preferably linear or branched ($C_1$-$C_4$)alkyl, and more preferably for linear or branched ($C_1$-$C_3$)alkyl, wherein more preferably $R^5$, $R^6$, and $R^7$ independently from one another stand for methyl or ethyl, wherein more preferably $R^5$, $R^6$, and $R^7$ stand for methyl. Further, it is preferred that $R^8$ stands for optionally heterocyclic 5- to 8-membered cycloalkyl, more preferably for 5- to 7-membered cycloalkyl, more preferably for 5- or 6-membered cycloalkyl, wherein even more preferably $R^8$ stands for optionally heterocyclic 6-membered cycloalkyl, and more preferably for cyclohexyl.

It is particularly preferred that the one or more tetraalkylammonium cation $R^5R^6R^7R^8N^+$-containing compounds comprise one or more N,N,N-tri($C_1$-$C_4$)alkyl-($C_5$-$C_7$)cycloalkylammonium compounds, preferably one or more N,N,N-tri($C_1$-$C_3$)alkyl-($C_5$-$C_6$)cycloalkylammonium compounds, more preferably one or more N,N,N-tri($C_1$-$C_2$)alkyl-($C_5$-$C_6$)cycloalkylammonium compounds, more preferably one or more N,N,N-tri($C_1$-$C_2$)alkyl-cyclopentylammonium and/or one or more N,N,N-tri($C_1$-$C_2$)alkyl-cyclohexylammonium compounds, more preferably one or more compounds selected from N,N,N-triethyl-cyclohexylammonium, N,N-diethyl-methyl-cyclohexylammonium, N,N-dimethyl-ethyl-cyclohexylammonium, N,N,N-trimethyl-cyclohexylammonium compounds, and mixtures of two or more thereof It is more particularly preferred that the one or more tetraalkylammonium cation $R^5R^6R^7R^8N^+$-containing compounds comprise one or more N,N,N-trimethyl-cyclohexylammonium compounds, and wherein more preferably the one or more tetraalkylammonium cation $R^5R^6R^7R^8N^+$-containing compounds consist of one or more N,N,N-trimethyl-cyclohexylammonium compounds.

As regards the chemical or physical nature of the seed crystals, no particular restriction applies provided that the seed crystals are suitable for crystallizing the zeolitic material having a CHA-type framework structure from the mixture prepared in (i) and that they comprise one or more zeolitic materials containing one or more cationic organotemplates as counter-ions at the ion exchange sites of the framework structure. It is preferred that the one or more zeolitic materials contained in the seed crystals comprises $X_2O_3$, and preferably $Al_2O_3$, in its framework structure Further, it is preferred that the one or more zeolitic materials contained in the seed crystals comprises $X_2O_3$ and $Al_2O_3$ in its framework structure, wherein the molar ratio of the one or more cationic organotemplates to $X_2O_3$ in the framework structure of the zeolitic material contained in the seed crystals is preferably in the range of from 0.1 to 2.5, more preferably from 0.5 to 2.3, more preferably from 0.8 to 2.2, more preferably from 1 to 2.1, more preferably from 1.2 to 2, more preferably from 1.4 to 1.9, and more preferably from 1.6 to 1.8.

As regards the chemical or physical nature of the one or more zeolitic materials comprised in the seed crystals, no particular restriction applies such that it may comprise further components, e.g. further cations, in particular further metal cations, in particular at the ion exchange sites of the framework structure. It is preferred that the one or more zeolitic materials comprised in the seed crystals comprise 1 wt.-% or less of metal cations $M^{n+}$ as counter-ions at the ion exchange sites of the framework structure based on 100 wt.-% of $SiO_2$ in the one or more zeolitic materials, preferably 0.5 wt.-% or less, more preferably 0.1 wt.-% or less, more preferably 0.05 wt.-% or less, more preferably 0.01 wt.-% or less, more preferably 0.005 wt.-% or less, and even more preferably 0.001 wt.-% or less thereof. As regards the oxidation number n of the metal cations $M^{n+}$, no particular restriction applies. It is preferred that n=1 and/or 2 and/or 3, preferably 1 and/or 2, wherein more preferably n=1.

Further as regards the chemical or physical nature of M, no particular restriction applies provided that it is a metal. It is preferred that M stands for Na, preferably for Na and/or K, more preferably for one or more alkali metals, and more preferably for one or more alkali metals and/or one or more alkaline earth metals.

As disclosed herein, no particular restriction applies as regards the chemical or physical nature of the one or more zeolitic materials comprised in the seed crystals such that they may comprise further components, e.g. hydrogen cations $H^+$ as counter-ions at the ion exchange sites of the framework structure. It is preferred that the one or more zeolitic materials comprised in the seed crystals comprise 0.1 wt.-% or less of hydrogen cations $H^+$ as counter-ions at the ion exchange sites of the framework structure based on 100 wt.-% of $SiO_2$ in the one or more zeolitic materials, more preferably 0.05 wt.-% or less, more preferably 0.01 wt.-% or less, more preferably 0.005 wt.-% or less, more preferably 0.001 wt.-% or less, more preferably 0.0005 wt.-% or less, and even more preferably 0.0001 wt.-% or less of hydrogen cations H.

As disclosed above, again no particular restriction applies as regards the chemical or physical nature of the one or more zeolitic materials comprised in the seed crystals such that they may comprise further components, e.g. cations other than the one or more cationic organotemplates as counter-ions at the ion exchange sites of the framework structure. It is preferred that the one or more zeolitic materials comprised in the seed crystals comprise 1 wt.-% or less of cations other than the one or more cationic organotemplates as counter-ions at the ion exchange sites of the framework structure based on 100 wt.-% of $SiO_2$ in the one or more zeolitic materials, more preferably 0.5 wt.-% or less, more preferably 0.1 wt.-% or less, more preferably 0.05 wt.-% or less, more preferably 0.01 wt.-% or less, more preferably 0.005 wt.-% or less, and even more preferably 0.001 wt.-% or less.

As regards the physical or chemical nature of the cations other than the one or more cationic organotemplates, no particular restriction applies. It is preferred that the cations other than the one or more cationic organotemplates stand for $H^+$ and/or Nat, wherein more preferably the cations other than the one or more cationic organotemplates are selected from the group consisting of $H^+$, $NH_4^+$, $Na^+$, and mixtures of two or more thereof, more preferably from the group consisting of $H^+$, $NH_4^+$, $Na^+$, $K^+$, and mixtures of two or more thereof, more preferably from the group consisting of $H^+$, $NH_4^+$, alkali metals, and mixtures of two or more thereof, and more preferably from the group consisting of $H^+$, $NH_4^+$, alkali metals, alkaline earth metals, and mixtures of two or more thereof.

It is particularly preferred according to the present invention that the seed crystals consist of the one or more zeolitic materials containing one or more cationic organotemplates as counter-ions at the ion exchange sites of the framework structure.

As regards the conditions, e.g. the liquid hourly space velocity or the duration, of the process for continuously feeding the mixture prepared in (i) into a continuous flow reactor, no particular restriction applies provided that the liquid hourly space velocity is in the range of from 0.3 to 20 $h^{-1}$ for a duration of at least 1 h. It is preferred that the liquid hourly space velocity is in the range of from 0.05 to 10 $h^{-1}$, more preferably from 0.1 to 5 $h^{-1}$, more preferably from 0.2 to 3 $h^{-1}$, more preferably from 0.4 to 2 $h^{-1}$, more preferably from 0.6 to 1.5 $h^{-1}$, more preferably from 0.8 to 1.2 $h^{-1}$, and more preferably from 0.9 to 1 $h^{-1}$. Further, it is preferred that in (ii) the mixture prepared in (i) is continuously fed into the continuous flow reactor for a duration ranging from 3 h to 360 d, more preferably from 6 h to 120 d, more preferably from 12 h to 90 d, more preferably from 18 h to 60 d, more preferably from 1 to 30 d, more preferably from 1.5 to 25 d, more preferably from 2 to 20 d, more preferably from 2.5 to 15 d, more preferably from 3 to 12 d, more preferably from 3.5 to 8 d, and more preferably from 4 to 6 d.

As regards the conditions, e.g. the temperature, of the crystallizing in (iii) of the zeolitic material having a CHA-type framework structure from the mixture in the continuous flow reactor, no particular restriction applies provided that the mixture is heated to a temperature in the range of from 100 to 300° C.; wherein the volume of the continuous flow reactor is in the range of from 50 $cm^3$ to 75 $m^3$. It is preferred that in (iii) the mixture is heated to a temperature in the range of from 100 to 280° C., more preferably of from 150 to 270° C., more preferably of from 180 to 260° C., more preferably of from 200 to 250° C., more preferably of from 210 to 240° C., and more preferably of from 220 to 235° C.

As regards the geometry of the continuous flow reactor, no particular restriction applies provided that the volume of the continuous flow reactor is in the range of from 50 $cm^3$ to 75 $m^3$. It is preferred that the volume of the continuous flow reactor is in the range of from 50 $cm^3$ to 3 $m^3$, preferably from 55 $cm^3$ to 1 $m^3$, more preferably from 60 $cm^3$ to 0.7 $m^3$, more preferably from 65 $cm^3$ to 0.3 $m^3$, more preferably from 70 $cm^3$ to 0.1 $m^3$, more preferably from 75 to 70,000 $cm^3$, more preferably from 80 to 50,000 $cm^3$, more preferably from 85 to 30,000 $cm^3$, more preferably from 90 to 10,000 $cm^3$, more preferably from 95 to 7,000 $cm^3$, more preferably from 100 to 5,000 $cm^3$, more preferably from 105 to 3,000 $cm^3$, more preferably from 110 to 1,000 $cm^3$, more preferably from 115 to 700 $cm^3$, more preferably from 120 to 500 $cm^3$, more preferably from 125 to 350 $cm^3$, more preferably from 130 to 250 $cm^3$, more preferably from 135 to 200 $cm^3$, more preferably from 140 to 180 $cm^3$, and more preferably from 145 to 160 $cm^3$.

As regards the type of the continuous flow reactor, again no particular restriction applies provided that the volume of the continuous flow reactor is in the range of from 50 $cm^3$ to 75 $m^3$. It is preferred that the continuous flow reactor is selected among a tubular reactor, a ring reactor, and a continuously oscillating reactor, preferably among a plain tubular reactor, a tubular membrane reactor, a tubular reactor with Coanda effect, a ring reactor, a continuously oscillating baffled reactor, and combinations thereof, wherein more preferably the continuous flow reactor is a plain tubular reactor and/or a ring reactor, wherein more preferably the continuous flow reactor is a plain tubular reactor.

In the case where the continuous flow reactor is a tubular reactor, again no particular restriction applies as regards the geometry of the tubular reactor. It is preferred that at least a portion of the tubular reactor is of a regular cylindrical form having a constant inner diameter perpendicular to the direction of flow, wherein the inner diameter is preferably in the range of from 2 to 1200 mm, more preferably from 3 to 800 mm, more preferably from 3 to 500 mm, more preferably from 4 to 200 mm, more preferably from 4 to 100 mm, more preferably from 4.5 to 50 mm, more preferably from 4.5 to 30 mm, more preferably from 5 to 15 mm, more preferably from 5 to 10 mm, more preferably from 5.5 to 8 mm, and more preferably from 5.5 to 6.5 mm.

As disclosed above, no particular restriction applies as regards the geometry, e.g. the length, of the continuous flow reactor, provided that the volume of the continuous flow reactor is in the range of from 50 cm$^3$ to 75 m$^3$. It is preferred that the continuous flow reactor has a length in the range of from 0.2 to 5,000 m, more preferably from 0.5 to 3,000 m, more preferably from 1 to 1,000 m more preferably from 3 to 500 m more preferably from 3.5 to 200 m, more preferably from 3.5 to 100 m, more preferably from 4 to 50 m, more preferably from 4 to 30 m, more preferably from 4.5 to 20 m, more preferably from 4.5 to 15 m, more preferably from 5 to 10 m, and more preferably from 5 to 7 m.

As regards the physical or chemical nature of the material of which the continuous flow reactor is made, in particular the wall or the walls thereof, again no particular restriction applies. It is preferred that the wall (or the walls) of the continuous flow reactor is (are) made of a metallic material, wherein the metallic material comprises one or more metals selected from the group consisting of Ta, Cr, Fe, Ni, Cu, Al, Mo, and combinations and/or alloys of two or more thereof, preferably from the group consisting of Ta, Cr, Fe, Ni, Mo, and combinations and/or alloys of two or more thereof, preferably from the group consisting of Cr, Fe, Ni, Mo, and combinations and/or alloys of two or more thereof wherein preferably the metallic material comprises a nickel alloy, a nickel-molybdenum alloy, and more preferably a nickel-molybdenum-chromium alloy. Further, it is particularly preferred that the surface of the inner wall (or of the inner walls) of the continuous flow reactor is (are) lined with an organic polymer material, wherein the organic polymer material preferably comprises one or more polymers selected from the group consisting of fluorinated polyalkylenes and mixtures of two or more thereof, preferably from the group consisting of (C2-C3)polyalkylenes and mixtures of two or more thereof, preferably from the group consisting of fluorinated polyethylenes and mixtures of two or more thereof, wherein more preferably the polymer material comprises poly(tetrafluoroethylene), wherein more preferably the inner wall of the continuous flow reactor is lined with poly(tetrafluoroethylene).

As disclosed herein, no particular restriction applies as regards the geometry of the continuous flow reactor, in particular in the case where the continuous flow reactor is a tubular reactor, more particular a plain tubular reactor. It is preferred that the continuous flow reactor is straight and/or comprises one or more curves with respect to the direction of flow, wherein preferably the continuous flow reactor is straight and/or has a coiled form with respect to the direction of flow.

As disclosed above, no particular restriction applies as regards the conditions of the crystallizing in (iii) of the zeolitic material having a CHA-type framework structure from the mixture in the continuous flow reactor. It is preferred that the conditions during crystallization in (iii) comprise vibrating of the mixture. Further, it is preferred that vibrating of the mixture is effected by vibration of the wall (or of the walls) of the continuous flow reactor. It is particularly preferred that the wall (or the walls) of the continuous flow reactor is (are) subject to vibration during crystallization in (iii).

As regards the conditions under which (iii) is conducted, e.g. the pressure under which the crystallizing in (iii) of the zeolitic material having a CHA-type framework structure from the mixture in the continuous flow reactor is conducted, no particular restriction applies provided that the mixture is heated to a temperature in the range of from 100 to 300° C. It is preferred that in (iii) the mixture is heated under autogenous pressure, wherein preferably the pressure is in the range of from 0.5 to 15 MPa, more preferably in the range of from 1 to 10 MPa, more preferably from 2 to 8 MPa, more preferably from 3 to 7 MPa, more preferably from 3.5 to 6.5 MPa, more preferably from 4 to 6 MPa, more preferably from 4.5 to 5.5 MPa, and more preferably from 4.8 to 5.2 MPa.

As disclosed herein, no particular restriction applies as regards the type of the continuous flow reactor. It is preferred that the continuous flow reactor consists of a single stage.

As disclosed herein, no particular restriction applies as regards the conditions in (iii) such that crystallizing in (iii) may comprise further process steps. It is preferred that no matter is added to and/or removed from the reaction mixture during its passage through the continuous flow reactor in (iii), wherein preferably no matter is added, wherein more preferably no matter is added and no matter is removed from the reaction mixture during its passage through the continuous flow reactor in (iii).

As regards the process of the present invention particularly defined by (i), (ii) and (iii), no particular restriction applies such that the process may comprise further steps. It is preferred that prior to (ii) the mixture prepared in (i) is aged at a temperature in the range of from 40 to 120° C., more preferably from 50 to 110° C., more preferably from 60 to 105° C., more preferably from 70 to 100° C., more preferably from 75 to 95° C., and more preferably from 80 to 90° C. Further, it is preferred that prior to (ii) the mixture prepared in (i) is aged for a duration ranging from 1 to 72 h, more preferably from 6 to 60 h, more preferably from 12 to 54 h, more preferably from 14 to 42 h, more preferably from 16 to 36 h, more preferably from 18 to 32 h, and more preferably from 20 to 28 h. It is particularly preferred that in (i) and prior to (ii) the mixture prepared in (i) is not heated to a temperature of 40° C. or greater, more preferably of 35° C. or greater, more preferably of 30° C. or greater, wherein more preferably in (i) and prior to (ii) the mixture prepared in (i) is not subject to a heating step.

As disclosed herein, no particular restriction applies to the process of the present invention particularly defined by (i), (ii) and (iii) such that the process may comprise further steps. It is preferred that the mixture prepared in (i) is directly fed to the continuous flow reactor in (ii). Further, it is particularly preferred that while being fed to the continuous flow reactor in (ii), the mixture prepared in (i) is pre-heated, preferably to a temperature in the range of from 100 to 280° C., preferably of from 150 to 270° C., more preferably of from 180 to 260° C., more preferably of from 200 to 250° C., more preferably of from 210 to 240° C., and more preferably of from 220 to 235° C.

As disclosed herein, no particular restriction applies to the process of the present invention particularly defined by (i), (ii) and (iii) such that the process may comprise further steps. It is preferred that the process further comprises (iv) quenching the reaction product effluent continuously exiting the reactor in (iii) with a liquid comprising one or more solvents and/or via expansion of the reaction product effluent; and/or, preferably and, (v) isolating the zeolitic material obtained in (iii) or (iv); and/or, preferably and, (vi) washing the zeolitic material obtained in (iii), (iv) or (v);

and/or, preferably and, (vii) drying the zeolitic material obtained in (iii), (iv), (v), or (vi);

and/or, preferably and, (viii) calcining the zeolitic material obtained in (iii), (iv), (v), (vi), or (vii).

Therefore, it is particularly preferred that the process further comprises (iv) quenching the reaction product effluent continuously exiting the reactor in (iii) with a liquid comprising one or more solvents and/or via expansion of the reaction product effluent; and optionally (v) isolating the zeolitic material obtained in (iii) or (iv); and optionally (vi) washing the zeolitic material obtained in (iii), (iv) or (v); and optionally (vii) drying the zeolitic material obtained in (iii), (iv), (v), or (vi); and optionally (viii) calcining the zeolitic material obtained in (iii), (iv), (v), (vi), or (vii).

In the case where the process comprises (iv), no particular restriction applies as regards the physical or chemical nature of the liquid comprising one or more solvents. It is preferred that in (iv) the liquid comprises one or more solvents selected from the group consisting of polar protic solvents and mixtures thereof. More preferably, the liquid comprises one or more solvents selected from the group consisting of n-butanol, isopropanol, propanol, ethanol, methanol, water, and mixtures thereof, more preferably from the group consisting of ethanol, methanol, water, and mixtures thereof. It is particularly preferred that the liquid comprises water, and wherein more preferably water is used as the liquid, preferably deionized water.

Further, in the case where the process comprises (iv), again no particular restriction applies as regards the conditions under which (iv) is conducted, e.g. the ratio of the liquid comprising one or more solvents to the reaction product effluent continuously exiting the reactor. It is preferred that in (iv) the weight ratio of the liquid comprising one or more solvents to the reaction product effluent continuously exiting the reactor is in the range of from 0.5 to 30, preferably from 1 to 25, more preferably from 2 to 20, more preferably from 3 to 18, more preferably from 4 to 15, more preferably from 5 to 12, more preferably from 6 to 10, more preferably from 6.5 to 9, more preferably from 7 to 8.5, and more preferably from 7.5 to 8.

In the case where the process comprises (vii), no particular restriction applies as regards the conditions, e.g. the temperature, under which in (vii) drying the zeolitic material obtained in (iii), (iv), (v), or (vi) is conducted. It is preferred that in (vii) drying the zeolitic material obtained in (iii), (iv), (v), or (vi) is effected at a temperature in the range from 50 to 220° C., more preferably from 70 to 180° C., more preferably from 80 to 150° C., more preferably from 90 to 130° C., more preferably from 100 to 120° C., and more preferably from 105 to 110° C.

In the case where the process comprises (viii), no particular restriction applies as regards the conditions, e.g. the temperature, under which in (viii) calcining the zeolitic material obtained in (iii), (iv), (v), (vi), or (vii) is conducted. It is preferred that in (viii) calcining the zeolitic material obtained in (iii), (iv), (v), (vi), or (vii) is effected at a temperature in the range from 300 to 750° C., more preferably from 325 to 650° C., more preferably from 350 to 600° C., more preferably from 375 to 550° C., more preferably from 400 to 500° C., and more preferably from 425 to 475° C.

In the case where the process comprises quenching in (iv) the reaction product effluent continuously exiting the reactor in (iii) with a liquid comprising one or more solvents and/or via expansion of the reaction product effluent, it is preferred that the supernatant obtained from the isolation of the zeolitic material in (v), and/or a feed having the same composition as said supernatant, is not at any point recycled to the reaction mixture during its passage through the continuous flow reactor.

As disclosed herein, no particular restriction applies to the process of the present invention particularly defined by (i), (ii) and (iii) such that the process may comprise further steps, in particular in the case where the process comprises (v). It is preferred that in (v) isolating the zeolitic material includes a step of spray-drying the zeolitic material obtained in (iii) or (iv), and/or wherein in (vii) drying of the zeolitic material includes a step of spray-drying the zeolitic material obtained in (iii), (iv), (v), or (vi).

As disclosed herein, no particular restriction applies as regards the one or more cationic organotemplates as counter-ions at the ion exchange sites of the framework structure contained in the one or more zeolitic materials such that any cationic organotemplate may be used provided that it is suitable for the synthesis of a zeolitic material. It is preferred that the one or more cationic organotemplates are selected from the group consisting of tetraalkylammonium cations and mixtures thereof.

In the case where the one or more cationic organotemplates are selected from the group consisting of tetraalkylammonium cations and mixtures thereof, no particular restriction applies as regards the chemical or physical nature of the tetraalkylammonium cations and mixtures thereof. It is preferred that the one or more cationic organotemplates are selected from the group consisting of 1-adamantyltri($C_1$-$C_3$)alkylammonium, N,N,N-tri($C_1$-$C_2$)alkyl-($C_5$-$C_6$)cycloalkylammonium, N,N,N-trimethyl-benzylammonium, and mixtures of two or more thereof, more preferably from the group consisting of 1-adamantyltri($C_1$-$C_2$)alkylammonium, N,N,N-tri($C_1$-$C_2$)alkyl-cyclopentylammonium, N,N,N-tri($C_1$-$C_2$)alkyl-cyclohexylammonium, and mixtures of two or more thereof, more preferably from the group consisting of 1-adamantyltriethylammonium, 1-adamantyldiethyl-methylalkylammonium, 1-adamantylethyl-dimethylammonium, 1-adamantyltrimethylammonium, N,N,N-triethyl-cyclohexylammonium, N,N-diethyl-N-methyl-cyclohexylammonium, N,N-dimethyl-N-ethyl-cyclohexylammonium, N,N,N-trimethyl-cyclohexylammonium, and mixtures of two or more thereof, wherein more preferably the one or more cationic organotemplates comprises 1-adamantyltrimethylammonium and/or N,N,N-trimethyl-cyclohexylammonium, wherein more preferably the one or more cationic organotemplates comprises 1-adamantyltrimethylammonium, wherein more preferably the one or more cationic organotemplates is adamantyltrimethylammonium and/or N,N,N-trimethyl-cyclohexylammonium, wherein more preferably the one or more cationic organotemplates is 1-adamantyltrimethylammonium.

As disclosed herein, no particular restriction applies as regards the chemical or physical nature of one or more tetraalkylammonium cation $R^5R^6R^7R^8N^+$-containing compounds as structure directing agent, such that any tetraalkylammonium cation $R^5R^6R^7R^8N^+$-containing compound can be used provided that it is suitable as structure directing agent and that $R^5$, $R^6$, and $R^7$ independently from one another stand for alkyl, and wherein $R^8$ stands for cycloalkyl. It is preferred that independently of one another the one or more tetraalkylammonium cation $R^5R^8R^7R^8N^+$-containing compounds are salts, preferably one or more salts selected from the group consisting of halides, preferably chloride and/or bromide, more preferably chloride, hydroxide, sulfate, nitrate, phosphate, acetate, and mixtures of two or more thereof, more preferably from the group consisting of chloride, hydroxide, sulfate, and mixtures of two or more thereof, wherein more preferably the one or more organotemplate compounds are hydroxides and/or chlorides, and even more preferably hydroxides.

As disclosed herein, no particular restriction applies as regards the physical or chemical nature, e.g. the molar ratio of the one or more tetraalkylammonium cation $R^5R^6R^7R^8N^+$-containing compounds to the one or more sources of $SiO_2$ calculated as $SiO_2$, of the mixture prepared in (i) and crystallized in (iii) provided that the mixture comprises one or more sources of $SiO_2$, one or more sources of $X_2O_3$, seed crystals, one or more tetraalkylammonium cation $R^5R^6R^7R^8N^+$-containing compounds as structure directing agent, and a liquid solvent system. It is preferred that the mixture prepared in (i) and crystallized in (iii) displays a molar ratio of the one or more tetraalkylammonium cation $R^5R^6R^7R^8N^+$-containing compounds to the one or more sources of $SiO_2$ calculated as $SiO_2$ in the range of from 0.01 to 2.0, more preferably from 0.05 to 1.0, more preferably from 0.08 to 0.5, more preferably from 0.1 to 0.3, more preferably from 0.12 to 0.25, more preferably from 0.15 to 0.22, more preferably from 0.16 to 0.2, more preferably from 0.17 to 0.19, and even more preferably from 0.175 to 0.18.

As regards the chemical or physical nature of the feed which is continuously fed in (ii) into a continuous flow reactor, no particular restriction applies provided that the liquid hourly space velocity is in the range of from 0.3 to 20 $h^{-1}$ for a duration of at least 1 h. It is preferred that the mixture prepared in (i) which preferably constitutes the feed crystallized in (iii) consists of a single liquid phase and a solid phase comprising the seed crystals.

In the case where the mixture prepared in (i) constitutes the feed crystallized in (iii), no particular restriction applies as regards the physical or chemical nature of said mixture such that it may comprise one or more phases, wherein the one or more phases may be liquid and/or solid. It is preferred that the mixture constituting the feed crystallized in (iii) consists of two liquid phases and a solid phase comprising the seed crystals, wherein the first liquid phase comprises the liquid solvent system, and the second liquid phase comprises a lubricating agent.

In the case where the mixture constituting the feed crystallized in (iii) consists of two liquid phases and a solid phase comprising the seed crystals, wherein the first liquid phase comprises the liquid solvent system, and the second liquid phase comprises a lubricating agent, no particular restriction applies as regards the lubricating agent. It is preferred that the lubricating agent comprises one or more fluorinated compounds, more preferably one or more fluorinated polymers, more preferably one or more fluorinated polyethers, and more preferably one or more perfluorinated polyethers. It is alternatively preferred that the lubricating agent comprises one or more fluorinated compounds, more preferably one or more fluorocarbons, more preferably one or more perfluorocarbons, more preferably the lubricating agent comprises perfluorodecalin.

As regards the conditions under which in (iii) crystallizing the zeolitic material having a CHA-type framework structure from the mixture in the continuous flow reactor is conducted, no particular restriction applies provided that the mixture is heated to a temperature in the range of from 100 to 300° C. and that the volume of the continuous flow reactor is in the range of from 50 $cm^3$ to 75 $m^3$. It is preferred that the mixture crystallized in (iii) in the continuous flow reactor is mechanically agitated. It is particularly preferred that the continuous flow reactor is mechanically agitated, wherein mechanical agitation is achieved by movable parts contained in the continuous flow reactor. In the case where the continuous flow reactor is mechanically agitated, wherein mechanical agitation is achieved by movable parts contained in the continuous flow reactor, it is more particularly preferred that the movable parts are provided such as to continually or periodically, preferably to continually free the walls of the continuous flow reactor from zeolitic materials and/or solid residue attached thereto, wherein more preferably the movable parts comprise a scraper, more preferably a screw, and more preferably a rotating screw.

As regards the physical or chemical nature of the one or more sources of $SiO_2$ for preparing the mixture in (i), no particular restriction applies such that the one or more sources of $SiO_2$ can comprises one or more compounds. It is preferred that the one or more sources of $SiO_2$ comprises one or more compounds selected from the group consisting of silicas, silicates, and mixtures thereof, more preferably from the group consisting of fumed silica, silica hydrosols, reactive amorphous solid silicas, silica gel, silicic acid, water glass, sodium metasilicate hydrate, sesquisilicate, disilicate, colloidal silica, pyrogenic silica, silicic acid esters, tetraalkoxysilanes, and mixtures of two or more thereof, more preferably from the group consisting of fumed silica, silica hydrosols, silica gel, silicic acid, water glass, colloidal silica, pyrogenic silica, silicic acid esters, tetraalkoxysilanes, and mixtures of two or more thereof, more preferably from the group consisting of silica hydrosols, silicic acid, water glass, colloidal silica, silicic acid esters, tetraalkoxysilanes, and mixtures of two or more thereof, more preferably from the group consisting of water glass, colloidal silica, silicic acid esters, tetraalkoxysilanes, and mixtures of two or more thereof more preferably from the group consisting of water glass, colloidal silica, and mixtures thereof, wherein more preferably the one or more sources of $SiO_2$ is selected from the group consisting of water glass, colloidal silica, and mixtures thereof, wherein more preferably colloidal silica is employed as the one or more sources of $SiO_2$.

As regards the physical or chemical nature of X comprised in the one or more sources of $X_2O_3$, no particular restriction applies provided that X is a trivalent element. It is preferred that X is selected from the group consisting of Al, B, In, Ga, and combinations of two or more thereof. It is particularly preferred that X is Al.

As regards the physical or chemical nature of the one or more sources of $X_2O_3$, no particular restriction applies provided that X is a trivalent element such that the one or more sources of $X_2O_3$ may comprise one or more compounds. It is preferred that the one or more sources of $X_2O_3$ comprises one or more aluminum salts, more preferably an aluminate of an alkali metal and/or aluminum hydroxide, preferably aluminum hydroxide, wherein more preferably the one or more sources of $X_2O_3$ is an aluminate of an alkali metal and/or aluminum hydroxide, preferably aluminum hydroxide, wherein the alkali metal is preferably selected from the group consisting of Li, Na, K, Rb, and Cs, wherein more preferably the alkali metal is Na and/or K, and wherein even more preferably the alkali metal is Na.

As regards the chemical or physical nature of the mixture prepared in (i), no particular restriction applies provided that the mixture comprises one or more sources of $SiO_2$, one or more sources of $X_2O_3$, seed crystals, one or more tetraalkylammonium cation $R^5R^6R^7R^8N^+$-containing compounds as structure directing agent, and a liquid solvent system, such that further components may be comprised in the mixture prepared in (i). It is preferred that the mixture prepared in (i) and crystallized in (iii) further comprises one or more tetraalkylammonium cation $R^1R^2R^3R^4N^+$-containing compounds, wherein $R^1$, $R^2$, $R^3$, and $R^4$ independently from one another stand for alkyl, preferably for optionally branched ($C_1$-$C_6$)alkyl, preferably ($C_1$-$C_5$)alkyl, more preferably ($C_1$-$C_4$)alkyl, and more preferably for optionally branched ($C_1$-$C_3$)alkyl, wherein more preferably $R^1$, $R^2$, $R^3$, and $R^4$ independently from one another stand for methyl or ethyl, wherein more preferably $R^1$, $R^2$, $R^3$, and $R^4$ stand for methyl.

In the case where the mixture prepared in (i) and crystallized in (iii) further comprises one or more tetraalkylammonium cation $R^1R^2R^3R^4N^+$-containing compounds, no particular restriction applies as regards the physical or chemical nature thereof such that the one or more tetraalkylammonium cation $R^1R^2R^3R^4N^+$-containing compounds may comprise one or more compounds. It is preferred that independently of one another the one or more tetraalkylammonium cation $R^1R^2R^3R^4N^+$-containing compounds are salts, preferably one or more salts selected from the group consisting of halides, preferably chloride and/or bromide, more preferably chloride, hydroxide, sulfate, nitrate, phosphate, acetate, and mixtures of two or more thereof, more preferably from the group consisting of chloride, hydroxide, sulfate, and mixtures of two or more thereof, wherein more preferably the one or more tetraalkylammonium cation $R^1R^2R^3R^4N^+$-containing compounds are tetraalkylammonium hydroxides and/or chlorides, and more preferably tetraalkylammonium hydroxides.

In the case where independently of one another the one or more tetraalkylammonium cation $R^1R^2R^3R^4N^+$-containing compounds are salts, no restriction applies as regards the chemical or physical nature thereof. It is preferred that the salts, preferably one or more salts, are selected from the group consisting of halides, preferably chloride and/or bromide, more preferably chloride, hydroxide, sulfate, nitrate, phosphate, acetate, and mixtures of two or more thereof, more preferably from the group consisting of chloride, hydroxide, sulfate, and mixtures of two or more thereof, wherein more preferably the one or more tetraalkylammonium cation $R^1R^2R^3R^4N^+$-containing compounds are tetraalkylammonium hydroxides and/or chlorides, and more preferably tetraalkylammonium hydroxides.

In the case where the mixture prepared in (i) and crystallized in (iii) further comprises one or more tetraalkylammonium cation $R^1R^2R^3R^4N^+$-containing compounds, no particular restriction applies as regards the physical or chemical nature of the mixture prepared in (i). Thus, no particular restriction applies as regards the molar ratio of the one or more tetraalkylammonium cation $R^1R^2R^3R^4N^+$-containing compounds to the one or more sources of $SiO_2$ calculated as $SiO_2$. It is preferred that the mixture prepared in (i) and crystallized in (iii) displays a molar ratio of the one or more tetraalkylammonium cation $R^1R^2R^3R^4N^+$-containing compounds to the one or more sources of $SiO_2$ calculated as $SiO_2$ in the range of from 0.001 to 1, more preferably from 0.005 to 0.5, more preferably from 0.01 to 0.3, more preferably from 0.03 to 0.25, more preferably from 0.05 to 0.2, more preferably from 0.07 to 0.17, more preferably from 0.09 to 0.15, more preferably from 0.1 to 0.13, and even more preferably from 0.11 to 0.12. Further, it is preferred that the molar ratio of the one or more tetraalkylammonium cation $R^1R^2R^3R^4N^+$-containing compounds to the one or more organotemplate compounds in the mixture prepared in (i) and crystallized in (iii) ranges from 0.01 to 5, preferably from 0.05 to 2, more preferably from 0.1 to 1.5, more preferably from 0.2 to 1.2, more preferably from 0.3 to 1, more preferably from 0.4 to 0.9, more preferably from 0.5 to 0.8, and even more preferably from 0.6 to 0.7.

As disclosed herein, no particular restriction applies as regards the chemical or physical nature of the mixture prepared in (i) provided that the mixture prepared in (i) comprises one or more sources of $SiO_2$, one or more sources of $X_2O_3$, seed crystals, one or more tetraalkylammonium cation $R^5R^6R^7R^8N^+$-containing compounds as structure directing agent, and a liquid solvent system. Thus, no particular restriction as regards the $SiO_2:X_2O_3$ molar ratio of the mixture prepared in (i). It is preferred that the $SiO_2:X_2O_3$ molar ratio of the mixture prepared in (i) ranges from 1 to 500, more preferably from 2 to 200, more preferably from 5 to 150, more preferably from 10 to 100, more preferably from 15 to 50, more preferably from 20 to 40, more preferably from 25 to 33, and more preferably from 27 to 29.

As disclosed above, no particular restriction applies as regards the chemical or physical nature of the mixture prepared in (i) provided that the mixture prepared in (i) comprises one or more sources of $SiO_2$, one or more sources of $X_2O_3$, seed crystals, one or more tetraalkylammonium cation $R^5R^6R^7R^8N^+$-containing compounds as structure directing agent, and a liquid solvent system. It is preferred that the amount of seed crystals in the mixture prepared in (i) ranges from 0.1 to 20 wt.-% based on 100 wt.-% of $SiO_2$ contained in the mixture, more preferably from 0.3 to 15 wt.-%, more preferably from 0.5 to 10 wt.-%, more preferably from 0.8 to 8 wt.-%, more preferably from 1 to 5 wt.-%, more preferably from 1.3 to 3 wt.-%, and more preferably from 1.5 to 2 wt.-%.

In the case where the mixture prepared in (i) comprises seed crystals in an amount in the range of from 0.1 to 20 wt.-% based on 100 wt.-% of $SiO_2$ contained in the mixture, preferably from 0.3 to 15 wt.-%, more preferably from 0.5 to 10 wt.-%, more preferably from 0.8 to 8 wt.-%, more preferably from 1 to 5 wt.-%, more preferably from 1.3 to 3 wt.-%, and more preferably from 1.5 to 2 wt.-%, no particular restriction applies as regards the physical or chemical nature of the zeolitic material comprised in the seed crystals such that the seed crystals may comprise one or more zeolitic material having a framework structure of any known type. It is preferred that the seed crystals comprise one or more zeolites having a CHA-type framework structure.

The seed crystals preferably have a crystallinity of at least 30%, more preferably the seed crystals have a crystallinity of at least 40%, more preferably of at least 50%.

The seed crystals preferably have a particle size D10 by volume as determined according to ISO 13320:2009, in the range of from 6 to 18 µm, more preferably in the range of from 8 to 16 µm, more preferably in the range of from 10 to 14 µm. The seed crystals preferably have a mean particle size D50 by volume as determined according to ISO 13320:

2009, in the range of from 100 to 200 µm, more preferably in the range of from 120 to 180 µm, more preferably in the range of from 140 to 160 µm. The seed crystals preferably have a particle size D90 by volume as determined according to ISO 13320:2009, in the range of from 420 to 580 µm, more preferably in the range of from 470 to 530 µm, more preferably in the range of from 490 to 510 µm.

As disclosed above, no particular restriction applies as regards the chemical or physical nature of the mixture prepared in (i) provided that the mixture prepared in (i) comprises one or more sources of $SiO_2$, one or more sources of $X_2O_3$, seed crystals, one or more tetraalkylammonium cation $R^5R^6R^7R^8N^+$-containing compounds as structure directing agent, and a liquid solvent system. Thus, the liquid solvent system may comprise one or more components. It is preferred that the liquid solvent system comprises one or more solvents, wherein the liquid solvent system more preferably comprises one or more solvents selected from the group consisting of polar protic solvents and mixtures thereof, preferably from the group consisting of n-butanol, isopropanol, propanol, ethanol, methanol, water, and mixtures thereof, more preferably from the group consisting of ethanol, methanol, water, and mixtures thereof, wherein more preferably the solvent system comprises water, and wherein more preferably water is used as the solvent system, preferably deionized water.

In the case where the liquid solvent system comprises one or more solvents, it is preferred that the mixture prepared in (i) comprises water as the solvent system. Further, as regards the $H_2O:SiO_2$ molar ratio of the mixture prepared in (i), no particular restriction applies. Thus, in the case where the mixture prepared in (i) comprises water as the solvent system, it is preferred that the $H_2O:SiO_2$ molar ratio of the mixture prepared in (i) ranges from 1 to 200, preferably from 3 to 100, more preferably from 5 to 50, more preferably from 7 to 30, more preferably from 9 to 25, more preferably from 10 to 20, more preferably from 11 to 16, more preferably from 12 to 14, and more preferably from 12.5 to 13.5.

As disclosed herein, no particular restriction applies as regards the physical or chemical nature of the mixture prepared in (i) provided that the mixture comprises one or more sources of $SiO_2$, one or more sources of $X_2O_3$, seed crystals, one or more tetraalkylammonium cation $R^5R^6R^7R^8N^+$-containing compounds as structure directing agent, and a liquid solvent system, such that the mixture prepared in (i) may comprise further components. It is preferred that the mixture prepared in (i) contains substantially no phosphorous and/or phosphorous containing compounds.

As regards the zeolitic material having a CHA-type framework structure crystallized in (iii) from the mixture in the continuous flow reactor, no particular restriction applies as regards its chemical or physical nature such that the zeolitic material itself or the framework of the zeolitic material crystallized in (iii) may contain further components. It is preferred that the framework of the zeolitic material obtained in (iii) contains substantially no phosphorous, wherein more preferably the zeolitic material obtained in (iii) contains substantially no phosphorous and/or phosphorous containing compounds.

As disclosed above, no particular restriction applies as regards the process of the present invention particularly defined by (i), (ii) and (iii) such that the process may comprise further steps. Also in the case where the inventive process comprises (iv) quenching the reaction product effluent continuously exiting the reactor in (iii) with a liquid comprising one or more solvents and/or via expansion of the reaction product effluent, no particular restriction applies as regards the process of the present invention such that the process particularly defined by (i), (ii), (iii) and (iv) may comprise further steps. It is preferred that the process further comprises (ix) subjecting the zeolitic material obtained in (v), (vi), (vii), or (viii) to an ion-exchange procedure, wherein at least one ionic non-framework element or compound contained in the zeolitic material is ion-exchanged against one or more metal ions.

In the case where the inventive process comprises (ix) subjecting the zeolitic material obtained in (v), (vi), (vii), or (viii) to an ion-exchange procedure, wherein at least one ionic non-framework element or compound contained in the zeolitic material is ion-exchanged against one or more metal ions, no particular restriction applies such that (ix) may comprise further steps. It is preferred that in (ix) the step of subjecting the zeolitic material to an ion-exchange procedure includes the steps of (ix.a) subjecting the zeolitic material obtained in (v), (vi), (vii), or (viii) to an ion-exchange procedure, wherein at least one ionic non-framework element or compound contained in the zeolitic material is ion-exchanged against $NH_4^+$;

(ix.b) calcining the ion-exchanged zeolitic material obtained in (ix.a) for obtaining the H-form of the zeolitic material;

(ix.c) subjecting the zeolitic material obtained in (ix.b) to an ion-exchange procedure, wherein $H^+$ contained in the zeolitic material as ionic non-framework element is ion-exchanged against one or more metal ions.

Further, in the case where the inventive process particularly comprises (ix.a), (ix.b) and (ix.c), no particular restriction applies as regards the chemical or physical nature of the one or more metal ions. It is preferred that the one or more metal ions are selected from the group consisting of ions of alkaline earth metal elements and/or transition metal elements, more preferably from the group consisting of ions of metals selected from group 4 and groups 6-11 of the Periodic Table of the Elements, more preferably from group 4 and groups 8-11, wherein more preferably the one or more metal ions are selected from the group consisting of ions of Mg, Ti, Cu, Co, Cr, Ni, Fe, Mo, Mn, Ru, Rh, Pd, Ag, Os, Ir, Pt, Au, and mixtures of two or more thereof, more preferably from the group consisting of ions of Ti, Cu, Fe, Rh, Pd, Pt, and mixtures of two or more thereof, wherein more preferably the at least one ionic non-framework element or compound contained in the zeolitic material is ion-exchanged against Cu and/or Fe, preferably against Cu.

Further, in the case where the inventive process particularly comprises (i), (ii), (iii), (iv) and (ix), no particular restriction applies as regards the loading of the zeolitic material with the one or more metal ions. It is preferred that in (ix) the zeolitic material is ion-exchanged such as to obtain a loading of the one or more metal ions in the zeolitic material ranging from 0.1 to 15 wt.-% calculated as the element and based on 100 wt.-% of $SiO_2$ contained in the zeolitic material, more preferably from 0.5 to 10 wt.-%, more preferably from 1 to 8 wt.-%, more preferably from 1.5 to 7 wt.-%, more preferably from 2 to 6 wt.-%, more preferably from 2.5 to 5.5 wt.-%, more preferably from 3 to 5 wt.-%, more preferably from 3.5 to 4.5 wt.-%, and more preferably from 3.8 to 4.2 wt.-%.

As regards the physical or chemical nature of the zeolitic material obtained from crystallization in (iii), no particular restriction applies in particular as regards the mean particle size of the zeolitic material. It is preferred that the mean particle size D50 by volume as determined according to ISO 13320:2009 of the zeolitic material obtained from crystallization in (iii) is of at least 0.5 μm, and is preferably in the range of from 0.5 to 1.5 μm, more preferably in the range of from 0.6 to 1.0 μm, and more preferably in the range of from 0.6 to 0.8 μm.

As disclosed herein, the present invention relates to an inventive process as defined in particular by the above embodiments. Further, the present invention also relates to a zeolitic material as obtainable and/or obtained according to the process of any of the embodiments defined herein, preferably according to the process described herein above, wherein the mixture constituting the feed crystallized in (iii) consists of two liquid phases and a solid phase comprising the seed crystals, wherein the first liquid phase comprises the liquid solvent system, and the second liquid phase comprises a lubricating agent.

Preferably, the zeolitic material as obtainable and/or obtained according to the process described herein above has a BET specific surface area, determined as described in Reference Example 3, in the range of from 550 to 710 m$^2$/g, more preferably in the range of from 590 to 680 m$^2$/g, more preferably in the range of from 605 to 655 m$^2$/g, more preferably in the range of from 615 to 640 m$^2$/g. Preferably, the zeolitic material as obtainable and/or obtained according to the process described herein above has a micropore volume, determined using Reference Example 4 in the range of from 0.18 to 0.34 cm$^3$/g, more preferably in the range of from 0.2 to 0.32 cm$^3$/g, more preferably in the range of from 0.22 to 0.30 cm$^3$/g, more preferably in the range of from 0.24 to 0.28 cm$^3$/g.

Further, the present invention relates to the use of a zeolitic material in particular as obtainable and/or obtained according to any of the embodiments as disclosed herein. It is preferred that the zeolitic material is used as a molecular sieve, as an adsorbent, for ion-exchange, as a catalyst or a precursor thereof, and/or as a catalyst support or a precursor thereof, more preferably as a catalyst or a precursor thereof and/or as a catalyst support or a precursor thereof, more preferably as a catalyst or a precursor thereof, more preferably as a catalyst for the selective catalytic reduction (SCR) of nitrogen oxides NO$_x$; for the storage and/or adsorption of CO$_2$; for the oxidation of NH$_3$, in particular for the oxidation of NH$_3$ slip in diesel systems; for the decomposition of N$_2$O; as an additive in fluid catalytic cracking (FCC) processes; and/or as a catalyst in organic conversion reactions, preferably in the conversion of alcohols to olefins, and more preferably in methanol to olefin (MTO) catalysis; more preferably for the selective catalytic reduction (SCR) of nitrogen oxides NO$_x$, and more preferably for the selective catalytic reduction (SCR) of nitrogen oxides NON in exhaust gas from a combustion engine, preferably from a diesel engine or from a lean burn gasoline engine.

The present invention is further illustrated by the following embodiments and combinations of embodiments as indicated by the respective dependencies and back-references. In particular, it is noted that in each instance where a range of embodiments is mentioned, for example in the context of a term such as "The . . . of any of embodiments 1 to 4", every embodiment in this range is meant to be explicitly disclosed for the skilled person, i.e. the wording of this term is to be understood by the skilled person as being synonymous to "The . . . of any of embodiments 1, 2, 3, and 4".

1. A continuous process for preparing a zeolitic material having a CHA-type framework structure comprising SiO$_2$ and X$_2$O$_3$, said process comprising
    (i) preparing a mixture comprising one or more sources of SiO$_2$, one or more sources of X$_2$O$_3$, seed crystals, one or more tetraalkylammonium cation R$^5$R$^6$R$^7$R$^8$N$^+$-containing compounds as structure directing agent, and a liquid solvent system;
    (ii) continuously feeding the mixture prepared in (i) into a continuous flow reactor at a liquid hourly space velocity in the range of from 0.3 to 20 h$^{-1}$ for a duration of at least 1 h; and
    (iii) crystallizing the zeolitic material having a CHA-type framework structure from the mixture in the continuous flow reactor, wherein the mixture is heated to a temperature in the range of from 100 to 300° C.; wherein the volume of the continuous flow reactor is in the range of from 50 cm$^3$ to 75 m$^3$;
    wherein the seed crystals comprise one or more zeolitic materials containing one or more cationic organotemplates as counter-ions at the ion exchange sites of the framework structure;
    wherein X is a trivalent element,
    wherein R$^5$, R$^6$, and R$^7$ independently from one another stand for alkyl, and wherein R$^8$ stands for cycloalkyl.
2. The process of embodiment 1, wherein R$^5$, R$^6$, and R$^7$ independently from one another stand for optionally branched (C$_1$-C$_6$)alkyl, preferably (C$_1$-C$_5$)alkyl, more preferably (C$_1$-C$_4$)alkyl, and more preferably for optionally branched (C$_1$-C$_3$)alkyl, wherein more preferably R$^5$, R$^6$, and R$^7$ independently from one another stand for methyl or ethyl, wherein more preferably R$^5$, R$^6$, and R$^7$ stand for methyl.
3. The process of embodiment for 2, wherein R$^8$ stands for optionally heterocyclic 5- to 8-membered cycloalkyl, preferably for 5- to 7-membered cycloalkyl, more preferably for 5- or 6-membered cycloalkyl, wherein even more preferably R$^8$ stands for optionally heterocyclic 6-membered cycloalkyl, and more preferably for cyclohexyl.
4. The process of any one of embodiments 1 to 3, wherein the one or more tetraalkylammonium cation R$^5$R$^6$R$^7$R$^8$N$^+$-containing compounds comprise one or more N,N,N-tri(C$_1$-C$_4$)alkyl-(C$_5$-C$_7$)cycloalkylammonium compounds, preferably one or more N,N,N-tri (C$_1$-C$_3$)alkyl-(C$_5$-C$_6$)cycloalkylammonium compounds, more preferably one or more N,N,N-tri(C$_1$-C$_2$) alkyl-(C$_5$-C$_6$)cycloalkylammonium compounds, more preferably one or more N,N,N-tri(C$_1$-C$_2$)alkyl-cyclopentylammonium and/or one or more N,N,N-tri(C$_1$-C$_2$) alkyl-cyclohexylammonium compounds, more preferably one or more compounds selected from N,N,N-triethyl-cyclohexylammonium, N,N-diethyl-N-methyl-cyclohexylammonium, N,N-dimethyl-N-ethyl-cyclohexylammonium, N,N,N-trimethyl-cyclohexylammonium compounds, and mixtures of two or more thereof, wherein more preferably the one or more tetraalkylammonium cation R$^5$R$^6$R$^7$R$^8$N$^+$-containing compounds comprise one or more N,N,N-trimethyl-cyclohexylammonium compounds, and wherein more preferably the one or more tetraalkylammonium cation R$^5$R$^6$R$^7$R$^8$N$^+$-containing compounds consist of one or more N,N,N-trimethyl-cyclohexylammonium compounds.
5. The process of any one of embodiments 1 to 4, wherein the one or more zeolitic materials contained in the seed crystals comprises X$_2$O$_3$, and preferably Al$_2$O$_3$, in its framework structure, and wherein the molar ratio of the one or more cationic organotemplates to $X_2O_3$ in the framework structure of the zeolitic material contained in the seed crystals is preferably in the range of from 0.1 to 2.5, more preferably from 0.5 to 2.3, more preferably from 0.8 to 2.2, more preferably from 1 to 2.1, more preferably from 1.2 to 2, more preferably from 1.4 to 1.9, and more preferably from 1.6 to 1.8.

6. The process of any one of embodiments 1 to 5, wherein the one or more zeolitic materials comprised in the seed crystals comprise 1 wt.-% or less of metal cations $M^{n+}$ as counter-ions at the ion exchange sites of the framework structure based on 100 wt.-% of $SiO_2$ in the one or more zeolitic materials, preferably 0.5 wt.-% or less, more preferably 0.1 wt.-% or less, more preferably 0.05 wt.-% or less, more preferably 0.01 wt.-% or less, more preferably 0.005 wt.-% or less, and even more preferably 0.001 wt.-% or less thereof, wherein n=1 and/or 2 and/or 3, preferably 1 and/or 2, wherein more preferably n=1.

7. The process of embodiment 6, wherein M stands for Na, preferably for Na and/or K, more preferably for one or more alkali metals, and more preferably for one or more alkali metals and/or one or more alkaline earth metals.

8. The process of any one of embodiments 1 to 7, wherein the one or more zeolitic materials comprised in the seed crystals comprise 0.1 wt.-% or less of hydrogen cations $H^+$ as counter-ions at the ion exchange sites of the framework structure based on 100 wt.-% of $SiO_2$ in the one or more zeolitic materials, preferably 0.05 wt.-% or less, more preferably 0.01 wt.-% or less, more preferably 0.005 wt.-% or less, more preferably 0.001 wt.-% or less, more preferably 0.0005 wt.-% or less, and even more preferably 0.0001 wt.-% or less of hydrogen cations H.

9. The process of any one of embodiments 1 to 8, wherein the one or more zeolitic materials comprised in the seed crystals comprise 1 wt.-% or less of cations other than the one or more cationic organotemplates as counter-ions at the ion exchange sites of the framework structure based on 100 wt.-% of $SiO_2$ in the one or more zeolitic materials, preferably 0.5 wt.-% or less, more preferably 0.1 wt.-% or less, more preferably 0.05 wt.-% or less, more preferably 0.01 wt.-% or less, more preferably 0.005 wt.-% or less, and even more preferably 0.001 wt.-% or less thereof.

10. The process of embodiment 9, wherein the cations other than the one or more cationic organotemplates stand for $H^+$ and/or $Na^+$, wherein preferably the cations other than the one or more cationic organotemplates are selected from the group consisting of $H^+$, $NH_4^+$, $Na^+$, and mixtures of two or more thereof, more preferably from the group consisting of $H^+$, $NH_4^+$, $Na^+$, $K^+$, and mixtures of two or more thereof, more preferably from the group consisting of $H^+$, $NH_4^+$, alkali metals, and mixtures of two or more thereof, and more preferably from the group consisting of $H^+$, $NH_4^+$, alkali metals, alkaline earth metals, and mixtures of two or more thereof.

11. The process of any one of embodiments 1 to 10, wherein the seed crystals consist of the one or more zeolitic materials containing one or more cationic organotemplates as counter-ions at the ion exchange sites of the framework structure.

12. The continuous process of any one of embodiments 1 to 11, wherein the liquid hourly space velocity is in the range of from 0.05 to 10 $h^{-1}$, more preferably from 0.1 to 5 $h^{-1}$, more preferably from 0.2 to 3 $h^{-1}$, more preferably from 0.4 to 2 $h^{-1}$, more preferably from 0.6 to 1.5 $h^{-1}$, more preferably from 0.8 to 1.2 $h^{-1}$, and more preferably from 0.9 to 1 $h^{-1}$.

13. The continuous process of any one of embodiments 1 to 12, wherein in (ii) the mixture prepared in (i) is continuously fed into the continuous flow reactor for a duration ranging from 3 h to 360 d, more preferably from 6 h to 120 d, more preferably from 12 h to 90 d, more preferably from 18 h to 60 d, more preferably from 1 to 30 d, more preferably from 1.5 to 25 d, more preferably from 2 to 20 d, more preferably from 2.5 to 15 d, more preferably from 3 to 12 d, more preferably from 3.5 to 8 d, and more preferably from 4 to 6 d.

14. The process of any one of embodiments 1 to 13, wherein in (iii) the mixture is heated to a temperature in the range of from 100 to 280° C., preferably of from 150 to 270° C., more preferably of from 180 to 260° C., more preferably of from 200 to 250° C., more preferably of from 210 to 240° C., and more preferably of from 220 to 235° C.

15. The process of any one of embodiments 1 to 14, wherein the volume of the continuous flow reactor is in the range of from 50 $cm^3$ to 3 $m^3$, preferably from 55 $cm^3$ to 1 $m^3$, more preferably from 60 $cm^3$ to 0.7 $m^3$, more preferably from 65 $cm^3$ to 0.3 $m^3$, more preferably from 70 $cm^3$ to 0.1 $m^3$, more preferably from 75 to 70,000 $cm^3$, more preferably from 80 to 50,000 $cm^3$, more preferably from 85 to 30,000 $cm^3$, more preferably from 90 to 10,000 $cm^3$, more preferably from 95 to 7,000 $cm^3$, more preferably from 100 to 5,000 $cm^3$, more preferably from 105 to 3,000 $cm^3$, more preferably from 110 to 1,000 $cm^3$, more preferably from 115 to 700 $cm^3$, more preferably from 120 to 500 $cm^3$, more preferably from 125 to 350 $cm^3$, more preferably from 130 to 250 $cm^3$, more preferably from 135 to 200 $cm^3$, more preferably from 140 to 180 $cm^3$, and more preferably from 145 to 160 $cm^3$.

16. The process of any one of embodiments 1 to 15, wherein the continuous flow reactor is selected among a tubular reactor, a ring reactor, and a continuously oscillating reactor, preferably among a plain tubular reactor, a tubular membrane reactor, a tubular reactor with Coanda effect, a ring reactor, a continuously oscillating baffled reactor, and combinations thereof, wherein more preferably the continuous flow reactor is a plain tubular reactor and/or a ring reactor, wherein more preferably the continuous flow reactor is a plain tubular reactor.

17. The process of any one of embodiments 1 to 16, wherein the continuous flow reactor is a tubular reactor, and wherein at least a portion of the tubular reactor is of a regular cylindrical form having a constant inner diameter perpendicular to the direction of flow, wherein the inner diameter is preferably in the range of from 2 to 1200 mm, more preferably from 3 to 800 mm, more preferably from 3 to 500 mm, more preferably from 4 to 200 mm, more preferably from 4 to 100 mm, more preferably from 4.5 to 50 mm, more preferably from 4.5 to 30 mm, more preferably from 5 to 15 mm, more preferably from 5 to 10 mm, more preferably from 5.5 to 8 mm, and more preferably from 5.5 to 6.5 mm.

18. The process of any one of embodiments 1 to 17, wherein the continuous flow reactor has a length in the range of from 0.2 to 5,000 m, preferably from 0.5 to 3,000 m, more preferably from 1 to 1,000 m more preferably from 3 to 500 m more preferably from 3.5 to 200 m, more preferably from 3.5 to 100 m, more preferably from 4 to 50 m, more preferably from 4 to 30 m, more preferably from 4.5 to 20 m, more preferably from 4.5 to 15 m, more preferably from 5 to 10 m, and more preferably from 5 to 7 m.

19. The process of any one of embodiments 1 to 18, wherein the wall of the continuous flow reactor is made of a metallic material, wherein the metallic material comprises one or more metals selected from the group consisting of Ta, Cr, Fe, Ni, Cu, Al, Mo, and combinations and/or alloys of two or more thereof, preferably from the group consisting of Ta, Cr, Fe, Ni, Mo, and combinations and/or alloys of two or more thereof, preferably from the group consisting of Cr, Fe, Ni, Mo, and combinations and/or alloys of two or more thereof wherein preferably the metallic material comprises a nickel alloy, a nickel-molybdenum alloy, and more preferably a nickel-molybdenum-chromium alloy.

20. The process of any one of embodiments 1 to 19, wherein the surface of the inner wall of the continuous flow reactor is lined with an organic polymer material, wherein the organic polymer material preferably comprises one or more polymers selected from the group consisting of fluorinated polyalkylenes and mixtures of two or more thereof, preferably from the group consisting of ($C_2$-$C_3$)polyalkylenes and mixtures of two or more thereof, preferably from the group consisting of fluorinated polyethylenes and mixtures of two or more thereof, wherein more preferably the polymer material comprises poly(tetrafluoroethylene), wherein more preferably the inner wall of the continuous flow reactor is lined with poly(tetrafluoroethylene).

21. The process of any one of embodiments 1 to 20, wherein the continuous flow reactor is straight and/or comprises one or more curves with respect to the direction of flow, wherein preferably the continuous flow reactor is straight and/or has a coiled form with respect to the direction of flow.

22. The process of any one of embodiments 1 to 21, wherein the walls of the continuous flow reactor are subject to vibration during crystallization in (iii).

23. The process of any one of embodiments 1 to 22, wherein in (iii) the mixture is heated under autogenous pressure, wherein preferably the pressure is in the range of from 0.5 to 15 MPa, more preferably in the range of from 1 to 10 MPa, more preferably from 2 to 8 MPa, more preferably from 3 to 7 MPa, more preferably from 3.5 to 6.5 MPa, more preferably from 4 to 6 MPa, more preferably from 4.5 to 5.5 MPa, and more preferably from 4.8 to 5.2 MPa.

24. The process of any one of embodiments 1 to 23, wherein the continuous flow reactor consists of a single stage.

25. The process of any one of embodiments 1 to 24, wherein no matter is added to and/or removed from the reaction mixture during its passage through the continuous flow reactor in (iii), wherein preferably no matter is added, wherein more preferably no matter is added and no matter is removed from the reaction mixture during its passage through the continuous flow reactor in (iii).

26. The process of any one of embodiments 1 to 25, wherein prior to (ii) the mixture prepared in (i) is aged at a temperature in the range of from 40 to 120° C., preferably from 50 to 110° C., more preferably from 60 to 105° C., more preferably from 70 to 100° C., more preferably from 75 to 95° C., and more preferably from 80 to 90° C.

27. The process of any one of embodiments 1 to 26, wherein prior to (ii) the mixture prepared in (i) is aged for a duration ranging from 1 to 72 h, more preferably from 6 to 60 h, more preferably from 12 to 54 h, more preferably from 14 to 42 h, more preferably from 16 to 36 h, more preferably from 18 to 32 h, and more preferably from 20 to 28 h.

28. The process of any one of embodiments 1 to 27, wherein in (i) and prior to (ii) the mixture prepared in (i) is not heated to a temperature of 40° C. or greater, preferably of 35° C. or greater, more preferably of 30° C. or greater, wherein more preferably in (i) and prior to (ii) the mixture prepared in (i) is not subject to a heating step.

29. The process of any one of embodiments 1 to 28, wherein the mixture prepared in (i) is directly fed to the continuous flow reactor in (ii), wherein while being fed to the continuous flow reactor in (ii), the mixture prepared in (i) is pre-heated, preferably to a temperature in the range of from 100 to 280° C., preferably of from 150 to 270° C., more preferably of from 180 to 260° C., more preferably of from 200 to 250° C., more preferably of from 210 to 240° C., and more preferably of from 220 to 235° C.

30. The process of any one of embodiments 1 to 29, wherein the process further comprises (iv) quenching the reaction product effluent continuously exiting the reactor in (iii) with a liquid comprising one or more solvents and/or via expansion of the reaction product effluent;
and/or, preferably and,
(v) isolating the zeolitic material obtained in (iii) or (iv);
and/or, preferably and,
(vi) washing the zeolitic material obtained in (iii), (iv) or (v);
and/or, preferably and,
(vii) drying the zeolitic material obtained in (iii), (iv), (v), or (vi);
and/or, preferably and,
(viii) calcining the zeolitic material obtained in (iii), (iv), (v), (vi), or (vii).

31. The process of embodiment 30, wherein in (iv) the liquid comprises one or more solvents selected from the group consisting of polar protic solvents and mixtures thereof, preferably from the group consisting of n-butanol, isopropanol, propanol, ethanol, methanol, water, and mixtures thereof,
more preferably from the group consisting of ethanol, methanol, water, and mixtures thereof,
wherein more preferably the liquid comprises water, and wherein more preferably water is used as the liquid, preferably deionized water.

32. The process of embodiment 30 or 31, wherein in (iv) the weight ratio of the liquid comprising one or more solvents to the reaction product effluent continuously exiting the reactor in the range of from 0.5 to 30, preferably from 1 to 25, more preferably from 2 to 20, more preferably from 3 to 18, more preferably from 4 to 15, more preferably from 5 to 12, more preferably from 6 to 10, more preferably from 6.5 to 9, more preferably from 7 to 8.5, and more preferably from 7.5 to 8.

33. The process of any one of embodiments 30 to 32, wherein drying in (vii) is effected at a temperature in the range from 50 to 220° C., preferably from 70 to 180° C., more preferably from 80 to 150° C., more preferably from 90 to 130° C., more preferably from 100 to 120° C., and more preferably from 105 to 110° C.

34. The process of any one of embodiments 30 to 33, wherein the calcining in (viii) is effected at a temperature in the range from 300 to 750° C., more preferably from 325 to 650° C., more preferably from 350 to 600° C., more preferably from 375 to 550° C., more preferably from 400 to 500° C., and more preferably from 425 to 475° C.

35. The process of any one of embodiments 30 to 34, wherein the supernatant obtained from the isolation of the zeolitic material in (v), and/or a feed having the same composition as said supernatant, is not at any point recycled to the reaction mixture during its passage through the continuous flow reactor.

36. The process of any one of embodiments 30 to 35, wherein in (v) isolating the zeolitic material includes a step of spray-drying the zeolitic material obtained in (iii) or (iv), and/or
wherein in (vii) drying of the zeolitic material includes a step of spray-drying the zeolitic material obtained in (iii), (iv), (v), or (vi).

37. The process of any one of embodiments 1 to 36, wherein the one or more cationic organotemplates are selected from the group consisting of tetraalkylammonium cations and mixtures thereof.

38. The process of embodiment 37, wherein the one or more cationic organotemplates are selected from the group consisting of 1-adamantyltri($C_1$-$C_3$)alkylammonium, N,N,N-tri($C_1$-$C_2$)alkyl-($C_5$-$C_6$)cycloalkylammonium, N,N,N-trimethyl-benzylammonium, and mixtures of two or more thereof,
more preferably from the group consisting of 1-adamantyltri($C_1$-$C_2$)alkylammonium, N,N,N-tri($C_1$-$C_2$)alkyl-cyclopentylammonium, N,N,N-tri($C_1$-$C_2$)alkyl-cyclohexylammonium, and mixtures of two or more thereof,
more preferably from the group consisting of 1-adamantyltriethylammonium, 1-adamantyldiethylmethylalkylammonium, 1-adamantylethyl-dimethylammonium, 1-adamantyltrimethylammonium, N,N,N-triethyl-cyclohexylammonium, N,N-diethyl-N-methyl-cyclohexylammonium, N,N-dimethyl-ethyl-cyclohexylammonium, N,N,N-trimethyl-cyclohexylammonium, and mixtures of two or more thereof,
wherein more preferably the one or more cationic organotemplates comprises 1-adamantyltrimethylammonium and/or N,N,N-trimethyl-cyclohexylammonium,
wherein more preferably the one or more cationic organotemplates comprises 1-adamantyltrimethylammonium,
wherein more preferably the one or more cationic organotemplates is adamantyltrimethylammonium and/or N,N,N-trimethyl-cyclohexylammonium,
wherein more preferably the one or more cationic organotemplates is 1-adamantyltrimethylammonium.

39. The process of any one of embodiments 1 to 38, wherein independently of one another the one or more tetraalkylammonium cation $R^5R^6R^7R^8N^+$-containing compounds are salts, preferably one or more salts selected from the group consisting of halides, preferably chloride and/or bromide, more preferably chloride, hydroxide, sulfate, nitrate, phosphate, acetate, and mixtures of two or more thereof, more preferably from the group consisting of chloride, hydroxide, sulfate, and mixtures of two or more thereof, wherein more preferably the one or more organotemplate compounds are hydroxides and/or chlorides, and even more preferably hydroxides.

40. The process of any one of embodiments 1 to 39, wherein the mixture prepared in (i) and crystallized in (iii) displays a molar ratio of the one or more tetraalkylammonium cation $R^5R^6R^7R^8N^+$-containing compounds to the one or more sources of $SiO_2$ calculated as $SiO_2$ in the range of from 0.01 to 2.0, preferably from 0.05 to 1.0, more preferably from 0.08 to 0.5, more preferably from 0.1 to 0.3, more preferably from 0.12 to 0.25, more preferably from 0.15 to 0.22, more preferably from 0.16 to 0.2, more preferably from 0.17 to 0.19, and even more preferably from 0.175 to 0.18.

41. The process of any one of embodiments 1 to 40, wherein the mixture prepared in (i) and constituting the feed crystallized in (iii) consists of a single liquid phase and a solid phase comprising the seed crystals.

42. The process of any one of embodiments 1 to 40, wherein the mixture constituting the feed crystallized in (iii) consists of two liquid phases and a solid phase comprising the seed crystals, wherein the first liquid phase comprises the liquid solvent system, and the second liquid phase comprises a lubricating agent.

43. The process of embodiment 42, wherein the lubricating agent comprises one or more fluorinated compounds, preferably one or more fluorinated polymers, more preferably one or more fluorinated polyethers, and more preferably one or more perfluorinated polyethers.

44. The process of embodiment 42, wherein the lubricating agent comprises one or more fluorinated compounds, preferably one or more fluorocarbons, more preferably one or more perfluorocarbons, more preferably the lubricating agent comprises perfluorodecalin.

45. The process of any one of embodiments 1 to 44, wherein the mixture crystallized in (iii) in the continuous flow reactor is mechanically agitated, wherein preferably mechanical agitation is achieved by movable parts contained in the continuous flow reactor, wherein more preferably the movable parts are provided such as to continually or periodically, preferably to continually free the walls of the continuous flow reactor from zeolitic materials and/or solid residue attached thereto, wherein more preferably the movable parts comprise a scraper, more preferably a screw, and more preferably a rotating screw.

46. The process of any one of embodiments 1 to 45, wherein the one or more sources of $SiO_2$ comprises one or more compounds selected from the group consisting of silicas, silicates, and mixtures thereof,
preferably from the group consisting of fumed silica, silica hydrosols, reactive amorphous solid silicas, silica gel, silicic acid, water glass, sodium metasilicate hydrate, sesquisilicate, disilicate, colloidal silica, pyrogenic silica, silicic acid esters, tetraalkoxysilanes, and mixtures of two or more thereof,
more preferably from the group consisting of fumed silica, silica hydrosols, silica gel, silicic acid, water glass, colloidal silica, pyrogenic silica, silicic acid esters, tetraalkoxysilanes, and mixtures of two or more thereof,
more preferably from the group consisting of silica hydrosols, silicic acid, water glass, colloidal silica, silicic acid esters, tetraalkoxysilanes, and mixtures of two or more thereof,
more preferably from the group consisting of water glass, colloidal silica, silicic acid esters, tetraalkoxysilanes, and mixtures of two or more thereof
more preferably from the group consisting of water glass, colloidal silica, and mixtures thereof,
wherein more preferably the one or more sources of $SiO_2$ is selected from the group consisting of water glass, colloidal silica, and mixtures thereof, wherein more preferably colloidal silica is employed as the one or more sources of $SiO_2$.

47. The process of any one of embodiments 1 to 46, wherein X is selected from the group consisting of Al, B, In, Ga, and combinations of two or more thereof, X preferably being Al.

48. The process of any one of embodiments 1 to 47, wherein the one or more sources of $X_2O_3$ comprises one or more aluminum salts, preferably an aluminate of an alkali metal and/or aluminum hydroxide, preferably aluminum hydroxide, wherein more preferably the one or more sources of $X_2O_3$ is an aluminate of an alkali metal and/or aluminum hydroxide, preferably aluminum hydroxide, wherein the alkali metal is preferably selected from the group consisting of Li, Na, K, Rb, and Cs, wherein more preferably the alkali metal is Na and/or K, and wherein even more preferably the alkali metal is Na.

49. The process of any one of embodiments 1 to 48, wherein the mixture prepared in (i) and crystallized in (iii) further comprises one or more tetraalkylammonium cation $R^1R^2R^3R^4N^+$-containing compounds, wherein $R^1$, $R^2$, $R^3$, and $R^4$ independently from one another stand for alkyl, preferably for optionally branched $(C_1-C_6)$alkyl, preferably $(C_1-C_5)$alkyl, more preferably $(C_1-C_4)$alkyl, and more preferably for optionally branched $(C_1-C_3)$alkyl, wherein more preferably $R^1$, $R^2$, $R^3$, and $R^4$ independently from one another stand for methyl or ethyl, wherein more preferably $R^1$, $R^2$, $R^3$, and $R^4$ stand for methyl.

50. The process of embodiment 49, wherein independently of one another the one or more tetraalkylammonium cation $R^1R^2R^3R^4N^+$-containing compounds are salts, preferably one or more salts selected from the group consisting of halides, preferably chloride and/or bromide, more preferably chloride, hydroxide, sulfate, nitrate, phosphate, acetate, and mixtures of two or more thereof, more preferably from the group consisting of chloride, hydroxide, sulfate, and mixtures of two or more thereof, wherein more preferably the one or more tetraalkylammonium cation $R^1R^2R^3R^4N^+$-containing compounds are tetraalkylammonium hydroxides and/or chlorides, and more preferably tetraalkylammonium hydroxides.

51. The process of embodiment 48 or 50, wherein the mixture prepared in (i) and crystallized in (iii) displays a molar ratio of the one or more tetraalkylammonium cation $R^1R^2R^3R^4N^+$-containing compounds to the one or more sources of $SiO_2$ calculated as $SiO_2$ in the range of from 0.001 to 1, preferably from 0.005 to 0.5, more preferably from 0.01 to 0.3, more preferably from 0.03 to 0.25, more preferably from 0.05 to 0.2, more preferably from 0.07 to 0.17, more preferably from 0.09 to 0.15, more preferably from 0.1 to 0.13, and even more preferably from 0.11 to 0.12.

52. The process of any one of embodiments 48 to 51, wherein the molar ratio of the one or more tetraalkylammonium cation $R^1R^2R^3R^4N^+$-containing compounds to the one or more organotemplate compounds in the mixture prepared in (i) and crystallized in (iii) ranges from 0.01 to 5, preferably from 0.05 to 2, more preferably from 0.1 to 1.5, more preferably from 0.2 to 1.2, more preferably from 0.3 to 1, more preferably from 0.4 to 0.9, more preferably from 0.5 to 0.8, and even more preferably from 0.6 to 0.7.

53. The process of any one of embodiments 1 to 52, wherein the $SiO_2:X_2O_3$ molar ratio of the mixture prepared in (i) ranges from 1 to 500, preferably from 2 to 200, more preferably from 5 to 150, more preferably from 10 to 100, more preferably from 15 to 50, more preferably from 20 to 40, more preferably from 25 to 33, and more preferably from 27 to 29.

54. The process of any one of embodiments 1 to 53, wherein the amount of seed crystals in the mixture prepared in (i) ranges from 0.1 to 20 wt.-% based on 100 wt.-% of $SiO_2$ contained in the mixture, preferably from 0.3 to 15 wt.-%, more preferably from 0.5 to 10 wt.-%, more preferably from 0.8 to 8 wt.-%, more preferably from 1 to 5 wt.-%, more preferably from 1.3 to 3 wt.-%, and more preferably from 1.5 to 2 wt.-%.

55. The process of embodiment 54, wherein the seed crystals comprise one or more zeolites having a CHA-type framework structure.

56. The process of embodiment 55, wherein the seed crystals have a crystallinity of at least 30%, preferably wherein the seed crystals have a crystallinity of at least 40%, more preferably of at least 50%.

57. The process of embodiment 55 or 56, wherein the seed crystals have a particle size D10 by volume as determined according to ISO 13320:2009, in the range of from 6 to 18 μm, preferably in the range of from 8 to 16 μm, more preferably in the range of from 10 to 14 μm.

58. The process of any one of embodiments 55 to 57, wherein the seed crystals have a mean particle size D50 by volume as determined according to ISO 13320:2009, in the range of from 100 to 200 μm, preferably in the range of from 120 to 180 μm, more preferably in the range of from 140 to 160 μm.

59. The process of any one of embodiments 55 to 58, wherein the seed crystals have a particle size D90 by volume as determined according to ISO 13320:2009, in the range of from 420 to 580 μm, preferably in the range of from 470 to 530 μm, more preferably in the range of from 490 to 510 μm.

60. The process of any one of embodiments 1 to 59, wherein the liquid solvent system comprises one or more solvents, wherein the liquid solvent system preferably comprises one or more solvents selected from the group consisting of polar protic solvents and mixtures thereof,
preferably from the group consisting of n-butanol, isopropanol, propanol, ethanol, methanol, water, and mixtures thereof,
more preferably from the group consisting of ethanol, methanol, water, and mixtures thereof,
wherein more preferably the solvent system comprises water, and wherein more preferably water is used as the solvent system, preferably deionized water.

61. The process of embodiment 60, wherein the mixture prepared in (i) comprises water as the solvent system, wherein the $H_2O:SiO_2$ molar ratio of the mixture prepared in (i) preferably ranges from 1 to 200, preferably from 3 to 100, more preferably from 5 to 50, more preferably from 7 to 30, more preferably from 9 to 25, more preferably from 10 to 20, more preferably from 11 to 16, more preferably from 12 to 14, and more preferably from 12.5 to 13.5.

62. The process of any one of embodiments 1 to 61, wherein the mixture prepared in (i) contains substantially no phosphorous and/or phosphorous containing compounds.

63. The process of any one of embodiments 1 to 62, wherein the framework of the zeolitic material obtained in (iii) contains substantially no phosphorous, wherein preferably the zeolitic material obtained in (iii) contains substantially no phosphorous and/or phosphorous containing compounds.

64. The process of any one of embodiments 30 to 63, wherein the process further comprises (ix) subjecting the zeolitic material obtained in (v), (vi), (vii), or (viii) to an ion-exchange procedure, wherein at least one ionic non-framework element or compound contained in the zeolitic material is ion-exchanged against one or more metal ions.

65. The process of embodiment 64, wherein in (ix) the step of subjecting the zeolitic material to an ion-exchange procedure includes the steps of
(ix.a) subjecting the zeolitic material obtained in (v), (vi), (vii), or (viii) to an ion-exchange procedure, wherein at least one ionic non-framework element or compound contained in the zeolitic material is ion-exchanged against $NH_4^+$;
(ix.b) calcining the ion-exchanged zeolitic material obtained in (ix.a) for obtaining the H-form of the zeolitic material;
(ix.c) subjecting the zeolitic material obtained in (ix.b) to an ion-exchange procedure, wherein $H^+$ contained in the zeolitic material as ionic non-framework element is ion-exchanged against one or more metal ions.

66. The process of embodiment 65, wherein the one or more metal ions are selected from the group consisting of ions of alkaline earth metal elements and/or transition metal elements, preferably from the group consisting of ions of metals selected from group 4 and groups 6-11 of the Periodic Table of the Elements, more preferably from group 4 and groups 8-11, wherein more preferably the one or more metal ions are selected from the group consisting of ions of Mg, Ti, Cu, Co, Cr, Ni, Fe, Mo, Mn, Ru, Rh, Pd, Ag, Os, Ir, Pt, Au, and mixtures of two or more thereof, more preferably from the group consisting of ions of Ti, Cu, Fe, Rh, Pd, Pt, and mixtures of two or more thereof, wherein more preferably the at least one ionic non-framework element or compound contained in the zeolitic material is ion-exchanged against Cu and/or Fe, preferably against Cu.

67. The process of any one of embodiments 64 to 66, wherein in (ix) the zeolitic material is ion-exchanged such as to obtain a loading of the one or more metal ions in the zeolitic material ranging from 0.1 to 15 wt.-% calculated as the element and based on 100 wt.-% of $SiO_2$ contained in the zeolitic material, preferably from 0.5 to 10 wt.-%, more preferably from 1 to 8 wt.-%, more preferably from 1.5 to 7 wt.-%, more preferably from 2 to 6 wt.-%, more preferably from 2.5 to 5.5 wt.-%, more preferably from 3 to 5 wt.-%, more preferably from 3.5 to 4.5 wt.-%, and more preferably from 3.8 to 4.2 wt.-%.

68. The process of any one of embodiments 1 to 67, wherein the mean particle size D50 by volume as determined according to ISO 13320:2009 of the zeolitic material obtained from crystallization in (iii) is of at least 0.5 μm, and is preferably in the range of from 0.5 to 1.5 μm, more preferably in the range of from 0.6 to 1.0 μm, and more preferably in the range of from 0.6 to 0.8 μm.

69. A zeolitic material as obtainable and/or obtained according to the process of any one of embodiments 1 to 68, preferably according to any one of embodiments 42 to 44.

70. The zeolitic material of embodiment 69, having a BET specific surface area, determined as described in Reference Example 3, in the range of from 550 to 710 $m^2/g$, preferably in the range of from 590 to 680 $m^2/g$, more preferably in the range of from 605 to 655 $m^2/g$, more preferably in the range of from 615 to 640 $m^2/g$.

71. The zeolitic material of any one of embodiments 69 to 70, having a micropore volume, determined using Reference Example 4 in the range of from 0.18 to 0.34 $cm^3/g$, preferably in the range of from 0.2 to 0.32 $cm^3/g$, more preferably in the range of from 0.22 to 0.30 $cm^3/g$, more preferably in the range of from 0.24 to 0.28 $cm^3/g$.

72. Use of a zeolitic material according to embodiment 71 as a molecular sieve, as an adsorbent, for ion-exchange, as a catalyst or a precursor thereof, and/or as a catalyst support or a precursor thereof, preferably as a catalyst or a precursor thereof and/or as a catalyst support or a precursor thereof, more preferably as a catalyst or a precursor thereof, more preferably as a catalyst for the selective catalytic reduction (SCR) of nitrogen oxides NON; for the storage and/or adsorption of $CO_2$; for the oxidation of $NH_3$, in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins, and more preferably in methanol to olefin (MTO) catalysis; more preferably for the selective catalytic reduction (SCR) of nitrogen oxides NON, and more preferably for the selective catalytic reduction (SCR) of nitrogen oxides NON in exhaust gas from a combustion engine, preferably from a diesel engine or from a lean burn gasoline engine.

DESCRIPTION OF THE FIGURES

FIG. 3 displays two SEM images of a portion of a sample of the product obtained from Example 1 at different magnifications, wherein the scale in the images are indicated by the legend at the bottom right of the respective image.

FIG. 4 displays two SEM images of a portion of the product obtained from Example 2 at different magnifications, wherein the scale in the images are indicated by the legend at the bottom right of the respective image.

FIG. 7 displays two SEM images of a portion of the product obtained from Example 5 at different magnifications, wherein the scale in the images are indicated by the legend at the bottom right of the respective image.

FIG. 9 displays two SEM images of a portion of the product obtained from Example 7 at different magnifications, wherein the scale in the images are indicated by the legend at the bottom right of the respective image.

EXPERIMENTAL SECTION

Figure 1:
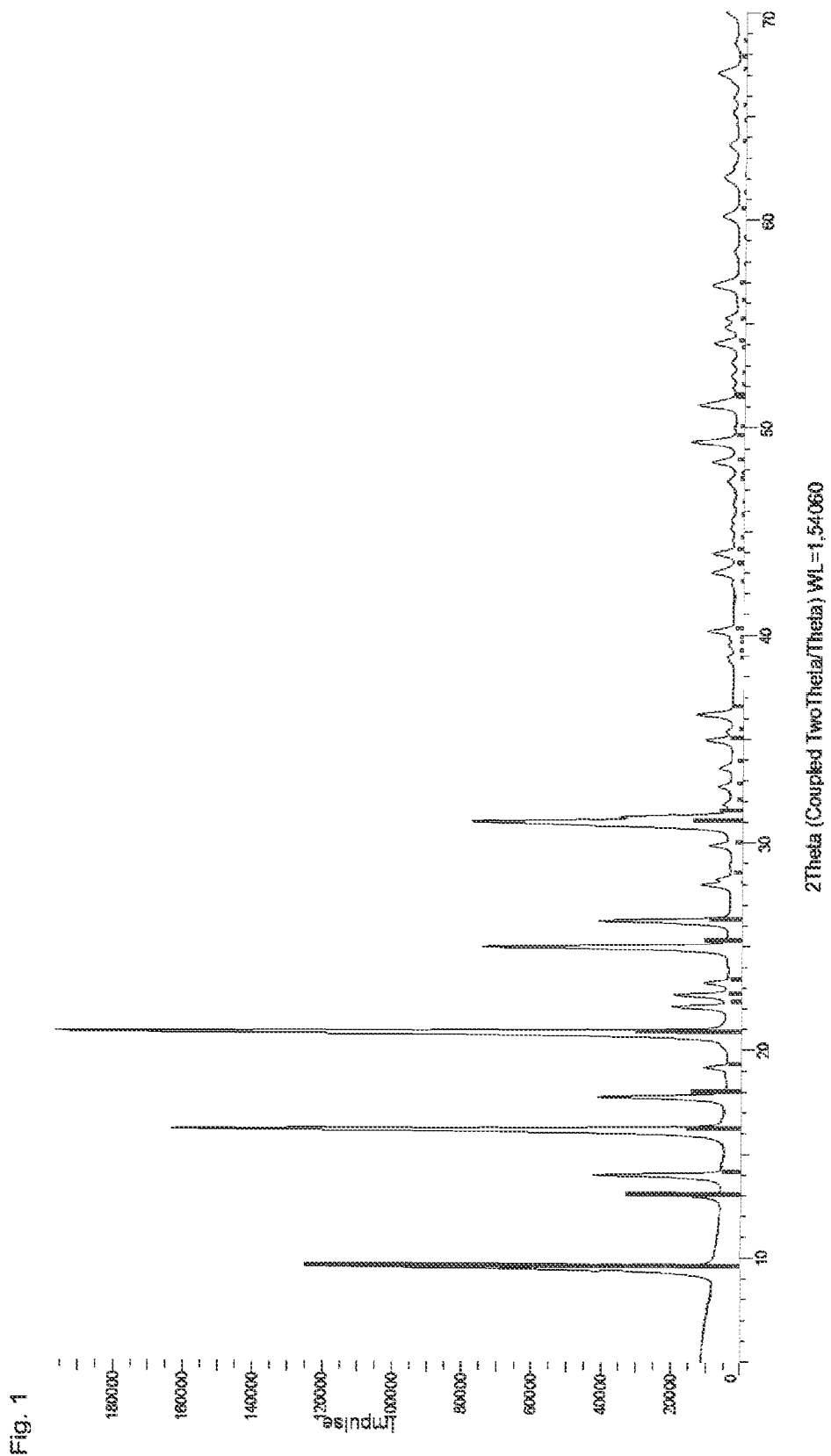
FIGS. 1, 2, 6, and 8 respectively show the X-ray diffraction pattern (measured using Cu K alpha-1 radiation) of the crystalline materials obtained according to Reference Example 1, Example 1, Example 5 and Example 6, respectively, wherein the line pattern of the CHA-type framework has been further included in the respective figures for comparison. In the figures, the angle 2 theta in ° is shown along the abscissa and the intensities are plotted along the ordinate.

Reference Example 1: Preparation of Seed Crystals Having a CHA-Type Framework Structure 194.5 g of deionized water and 943.1 g of a solution of 1-adamantyltrimethylammonium hydroxide (AdaTMAOH) (20.17 wt.-% aqueous solution obtained from BASF) were placed in a flask and treated with 86.4 g of a solution of sodium hydroxide (50 wt.-% aqueous solution) thus obtaining a clear solution. 28.1 g of aluminum hydroxide (obtained from Sigma Aldrich) were then added stepwise and the resulting mixture then stirred for 30 min at room temperature for obtaining a milky solution. 901.3 g of Ludox SM 30 (30 wt.-% $SiO_2$ suspension in water obtained from Sigma Aldrich) were then added under stirring during which the viscosity of the mixture in-creased. The suspension displaying molar ratios of $SiO_2$:Al(OH)$_3$:NaOH:AdaTMAOH of 1:0.04:0.24:0.20 was then stirred for a further 30 min at room temperature.

The reaction mixture was then placed in an autoclave with a volume of 2.5 L and then heated under stirring (200 rpm) in 45 min to 160° C., after which it was held at that temperature for 120 min. The maximum pressure measured in the autoclave during the reaction was 0.5 MPa (5 bar). After the synthesis, the suspension was filtered off and the solid product washed with distilled water. The filter cake (214.8 g) was then dried in a recirculating air oven at 120° C. over night for affording a crystalline product.

As may be taken from the X-ray diffraction pattern of the product in FIG. 1, it displays a CHA-type framework structure. The crystallinity was calculated to be 52% based on the X-ray diffractogramm of the sample in question. The mean particle size D50 by volume as determined according to ISO 13320:2009 was 150 μm, and the particle size D10 and D90 was 12 μm and 504 μm respectively.

Elemental analysis of the product afforded: C: 15.7%, Al: 2.3%, Na: 0.37%, Si: 34%.

Reference Example 2: Preparation of Synthesis Gel for the Continuous Synthesis of a Zeolitic Material Having a CHA-Type Framework Structure 423.3 g of an aqueous solution of cyclohexyltrimethylammonium hydroxide (CHTMAOH) (20 wt.-% aqueous solution from BASF) and 123.7 g of an aqueous solution of tetramethylammonium hydroxide (TMAOH) (25 wt.-% aqueous solution obtained from Sachem) were placed in a 2 L quadruple neck round bottom flask. 16.9 g of aluminum hydroxide (obtained from Wako) were then added stepwise and the resulting mixture then stirred for 45 min at room temperature for obtaining a white suspension. 450.0 g Ludox AS 40 (40 wt.-% $SiO_2$ suspension in water obtained from Grace) were then added under stirring and the result mixture then stirred for additional 15 min. 18.0 g of the crystalline product obtained from Reference Example 1 were then added, and the resulting mixture displaying molar ratios of $SiO_2$:Al(OH)$_3$:CHTMAOH:TMAOH:$H_2O$=1:0.072:0.177:0.113:13 was then heated to 85° C. and stirred (270 rpm) at that temperature over night for affording an aged gel.

Reference Example 3: Determination of the BET Specific Surface Area

The BET specific surface area was determined according to ISO 9277, second edition 2010, from the $N_2$-isotherm obtained via nitrogen physisorption at 77 K.

Reference Example 4: Determination of the Micropore Volume

The micropore volume was determined according to DIN 66134, from the $N_2$-isotherm obtained via nitrogen physisorption at 77 K.

Example 1: Continuous Synthesis of a Zeolitic Material Having a CHA-Type Framework Structure The synthesis gel obtained from Reference Example 2 was continuously fed into a tubular reactor made of stainless steel having an inner diameter of 6 mm and a reactor volume of 150 ml and continuously crystallized in the reactor at a temperature of 230° C. and at a pressure of 50 bar wherein the retention time was set to 2 h. High pressure ball valves were installed after the outlet of the reactor connected by a short steel tube of 2.5 mL (d=6 mm). The reaction mixture was continuously guided through the reactor by introducing the synthesis gel under high pressure. Every 2 min the first high pressure ball valve was opened to allow synthesis gel to flow into the short steel tube and then closed again to maintain the pressure on the reactor. After closing of the first high pressure ball valve, the second opened immediately, allowing the reaction mixture to exit the tube. The suspension obtained at the exit of the reactor was continuously collected, washed with water, and then filtered off, wherein the filter cake was dried in a recirculating air oven at 105° C. over night and subsequently calcined at 550° C. for 6 h.

Figure 2:
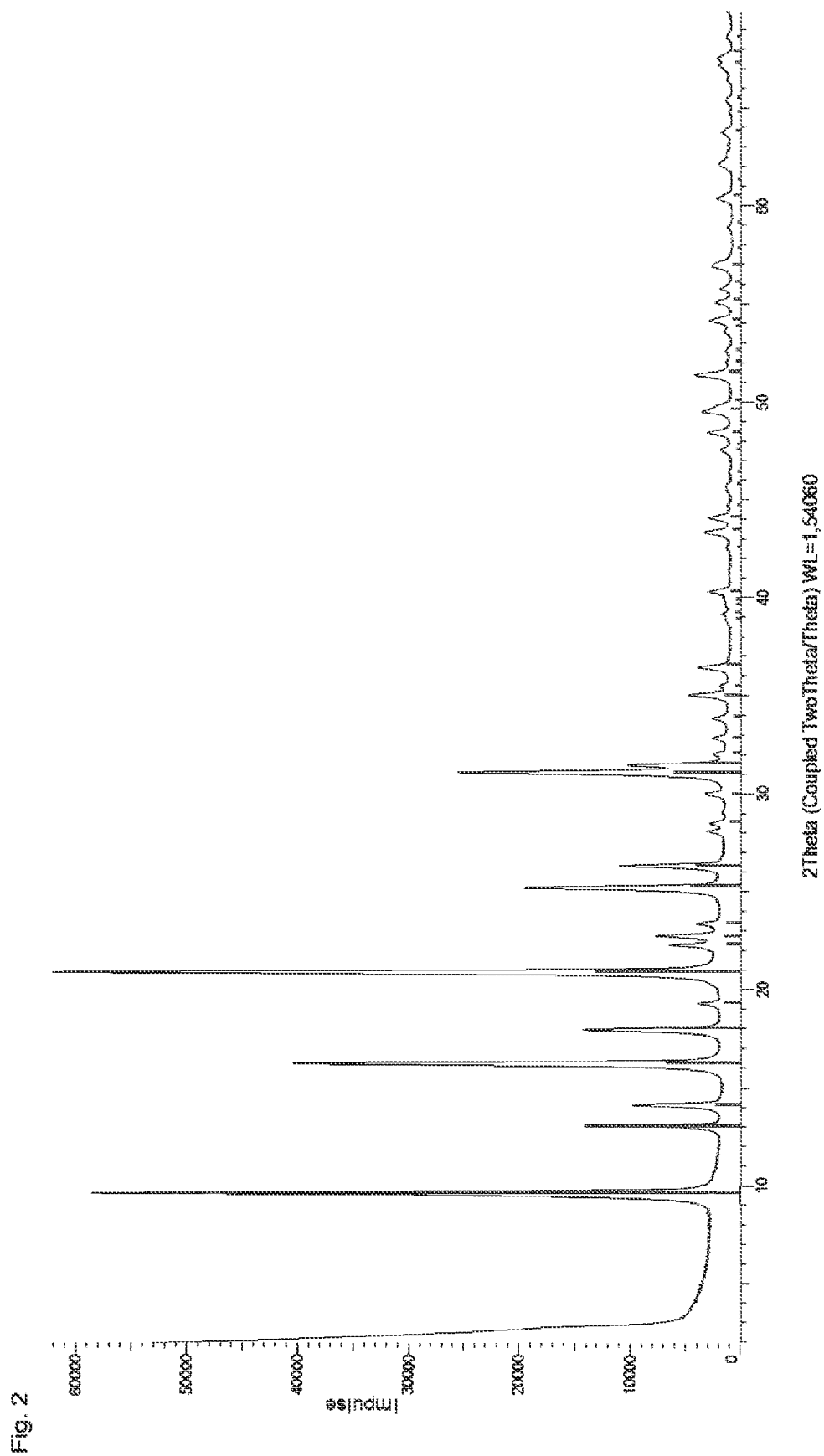

A sample of the product was analyzed via X-ray diffraction, elemental analysis and scanning electron microscopy (SEM):

As may be taken from the X-ray diffraction pattern of the sample of the product in FIG. 2, it displays a CHA-type framework structure. The crystallinity of the product was calculated to 91% based on the X-ray diffractogramm of the sample in question.

Elemental analysis of the sample of the product afforded: Al: 2.9%, Na: 0.15%, Si: 41%.

FIG. 3 displays two SEM images of a portion of the sample of the product at different magnifications.

Example 2: Ion Exchange of the Zeolitic Material Having a CHA-Type Framework Structure Obtained from Example 1

An aqueous solution of ammonium nitrate (50 wt.-%) is prepared in a 500 ml quadruple neck round bottom flask and heated to 60° C. A portion of the product obtained from Example 1 was then added to the solution under heating, wherein the weight ratio of zeolite:ammonium nitrate:deionized water in the heated mixture were 1:1:100. The resulting mixture was then stirred for 1 h at 60° C. The suspension was then filtered off and washed with water. The filter cake was then dried at 120° C. for 4 h and the temperature then raised to 550° C. at which it was then held for 6 h for calcination.

FIG. 4 displays two SEM images of a portion of the sample of the product at different magnifications.

Example 3: Preparation of a Cu-CHA Molded Material from the Ion-Exchanged Zeolitic Material from Example 2

A sample of the product obtained from Example 2 was loaded with copper via incipient wetness impregnation of the zeolitic material with a copper nitrate solution. The impregnated material was then dried for 20 h at 50° C. and then calcined at 450° C. for 5 h for affording Cu-CHA with 3.3 wt.-% of copper calculated as CuO. The resulting Cu-CHA material was then slurried with alumina binder for affording a mixture with 70 wt.-% Cu-CHA and 30 wt.-% alumina. The slurry was then dried under stirring and then calcined at 550° C. for 1 h. The resulting solid was crushed and sieved to afford a 250-500 μm fraction of the molded material.

Example 4: SCR Testing of the Molded Cu-CHA Material from Example 3

The molded material from Example 3 was tested in the selective catalytic reduction of NOx using a feed gas containing 500 ppm NO, 500 ppm $NH_3$, 5 vol.-% $H_2O$, 10 vol.-% $O_2$, and balance $N_2$, wherein the testing was conducted at a gas hourly space velocity of 80,000 $h^{-1}$. The sample amount was adjusted by dilution with corundum to 120 mg Cu-CHA/reactor, wherein the reactor volume was about 1 mL volume. A first set of samples was then aged at 650° C. in air with 10 vol.-% steam for 50 h, and a second set of samples was aged at 820° C. in air with 10 vol.-% steam for 16 h.

Figure 5:
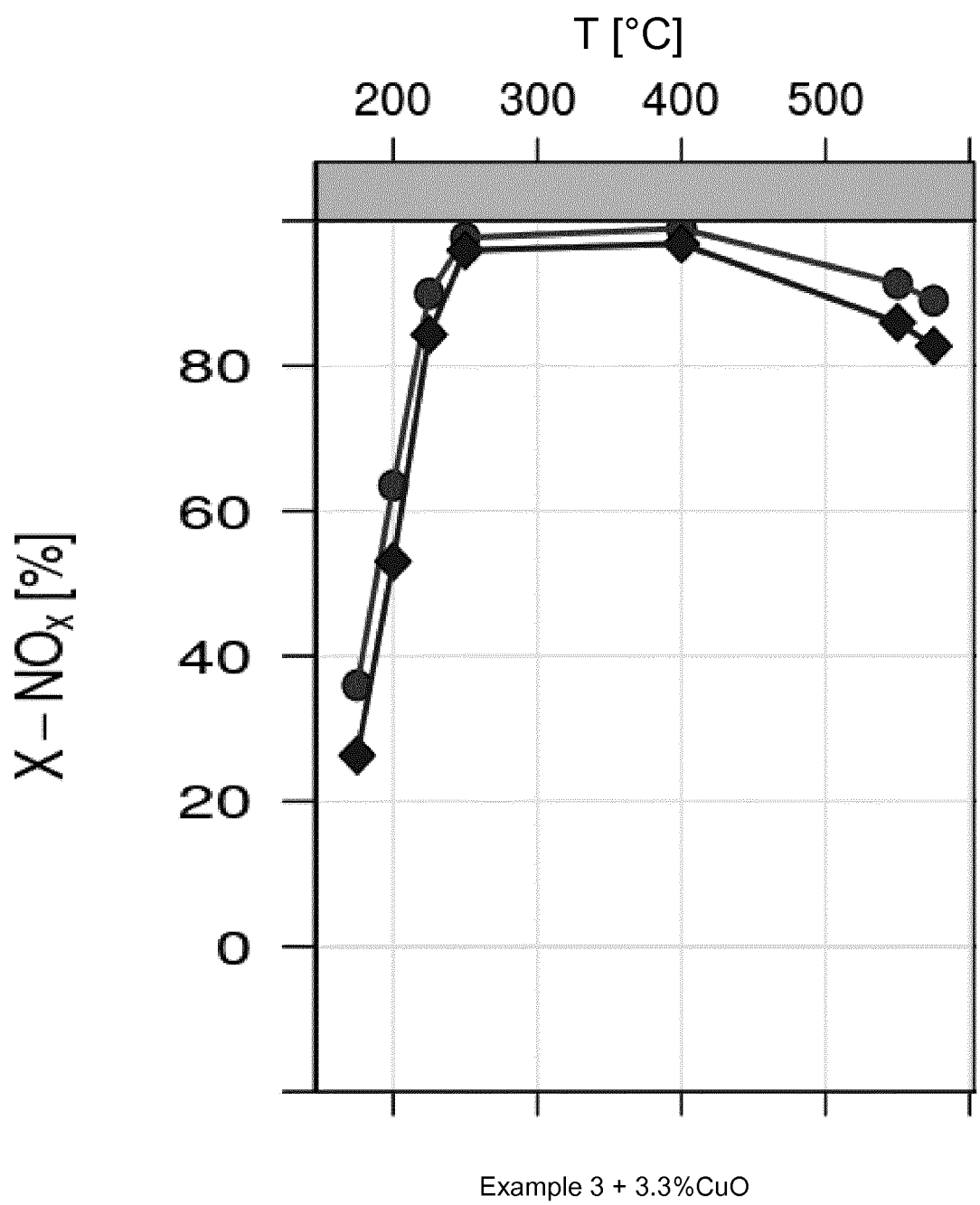
FIG. 5 displays results from SCR testing of Cu-CHA moldings from Example 3 according to Example 4, wherein the temperature in ° C. is shown along the abscissa, and the conversion rate of NOx in % is plotted along the ordinate. In the figure, the results for the samples aged at 650° C. for 50 h are indicated as "●", and the results for the samples aged at 820° C. for 16 h are indicated as "♦".

Prior to testing, a first run at 200° C., 400° C., and 575° C. was conducted for degreening of the respective samples. The SCR testing was then conducted with the aged samples, wherein the testing results are shown in FIG. 5. As may be taken from the results, the Cu-CHA molded material shows excellent SCR activity over a broad temperature range, even after severe aging at 820° C.

Example 5: Continuous Synthesis of a Zeolitic Material Having a CHA-Type Framework Structure Using a Lubricating Agent (Fomblin)

A teflon-lined tubular reactor having an inner diameter of 6.4 mm and a reactor volume of 160 ml was filled with 250 ml of a perfluoropolyether (Fomblin). The synthesis gel obtained from Reference Example 2 was then fed into the reactor and continuously crystallized in the reactor which was heated to a temperature of 240° C. and at a pressure of 60 bar wherein the retention time was set to 1 h. High pressure ball valves were installed after the outlet of the reactor connected by a short steel tube of 2.5 mL (d=6 mm). The reaction mixture was continuously guided through the reactor by introducing the synthesis gel under high pressure. Every 2 min the first high pressure ball valve was opened to allow synthesis gel to flow into the short steel tube and then closed again to maintain the pressure on the reactor. After closing of the first high pressure ball valve, the second opened immediately, allowing the reaction mixture to exit the tube. The suspension obtained at the exit of the reactor was continuously collected, wherein the perfluoropolyether was removed from the reaction product via phase separation. The aqueous phase was then centrifuged, and the solid washed with water and dried at 80° C. over night. The product was then calcined at 550° C.

Figure 6:
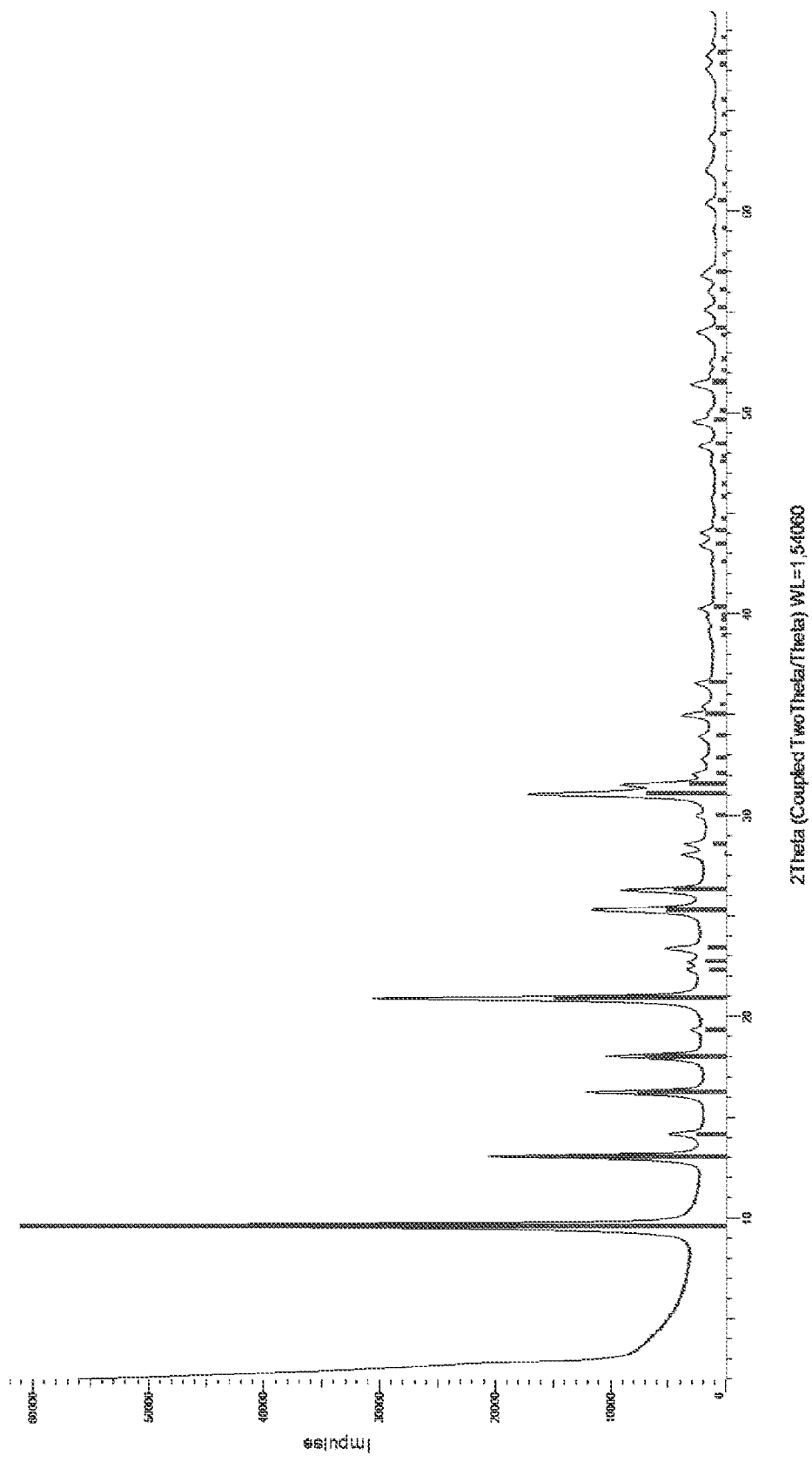

A sample of the product was analyzed via X-ray diffraction, elemental analysis and scanning electron microscopy (SEM):

As may be taken from the X-ray diffraction pattern of the sample of the product in FIG. 6, it displays a CHA-type framework structure. The crystallinity of the product was calculated to 87% based on the X-ray diffractogramm of the sample in question.

Elemental analysis of the sample of the product afforded: C: <0.1%, Al: 3.0%, Na: 0.13%, Si: 38%.

FIG. 7 displays two SEM images of a portion of the sample of the product at different magnifications.

Example 6: Continuous Synthesis of a Zeolitic Material Having a CHA-Type Framework Structure Using a Lubricating Agent (Perfluorinated Decalin)

Example 5 was repeated, yet instead of employing Fomblin as the lubricating agent, perfluorinated decalin was employed.

Figure 8:
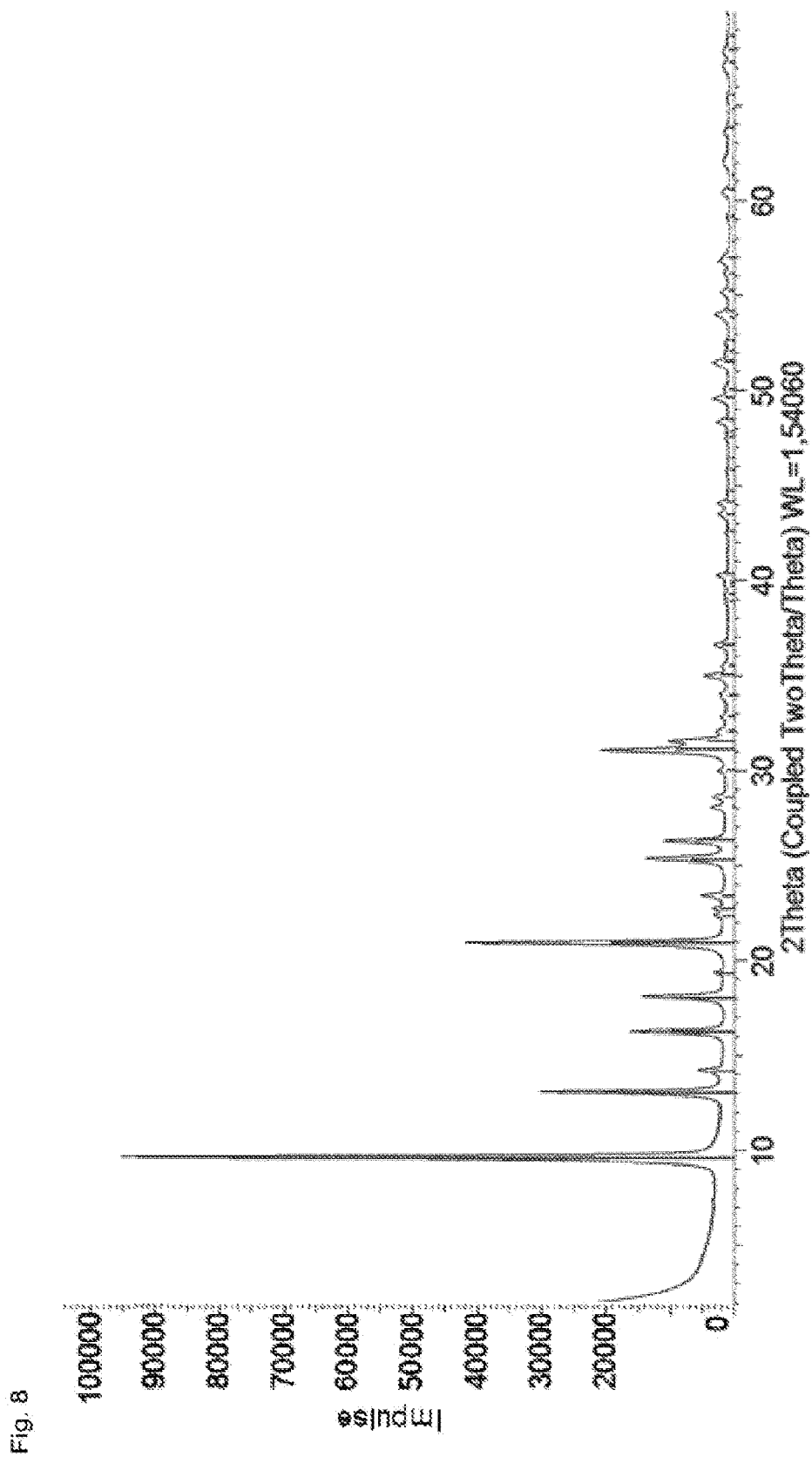

As may be taken from the X-ray diffraction pattern of the sample of the product in FIG. 8, it displays a CHA-type framework structure. The crystallinity of the product was calculated to be 93% based on the X-ray diffractogramm of the sample in question.

Elemental analysis of the sample of the product afforded: F<0.07 wt. %, C<0.1 wt. %, Al: 2.9 wt. %, Na: 0.10 wt. %, Si: 40 wt. %.

$N_2$ Isotherm of the sample of the product afforded: a BET specific surface area of 636.6 $m^2/g$, determined as described in Reference Example 3; a t-plot micropore volume of 0.267 cm$^3$/g, determined as described in Reference Example 4.

Example 7: Ion Exchange of the Zeolitic Material Having a CHA-Type Framework Structure Obtained from Example 6

Example 2 was repeated, yet instead of employing the zeolitic material having a CHA-type framework structure obtained from Example 1, the material obtained from Example 6 was employed.

Elemental analysis of the sample of the product afforded: F<0.03 wt. %, C<0.1 wt. %, Al: 2.7 wt. %, Na: <0.01 wt. %, Si: 38 wt. %.

N$_2$ Isotherm of the sample of the product afforded: a BET specific surface area of 620.6 m$^2$/g, determined as described in Reference Example 3; a t-plot micropore volume of 0.257 cm$^3$/g, determined as described in Reference Example 4.

FIG. 9 displays two SEM images of a portion of the sample of the product at different magnifications.

Example 8: Preparation of a Cu-CHA Molded Material from the Ion-Exchanged Zeolitic Material from Example 7

Example 3 was repeated, yet instead of employing the ion-exchanged zeolitic material from Example 2, the material from Example 7 was employed.

Example 9: SCR Testing of the Molded Cu-CHA Material from Example 8

Example 4 was repeated, yet instead of employing the Cu-CHA material from Example 3, the material from Example 8 was employed.

Figure 10:
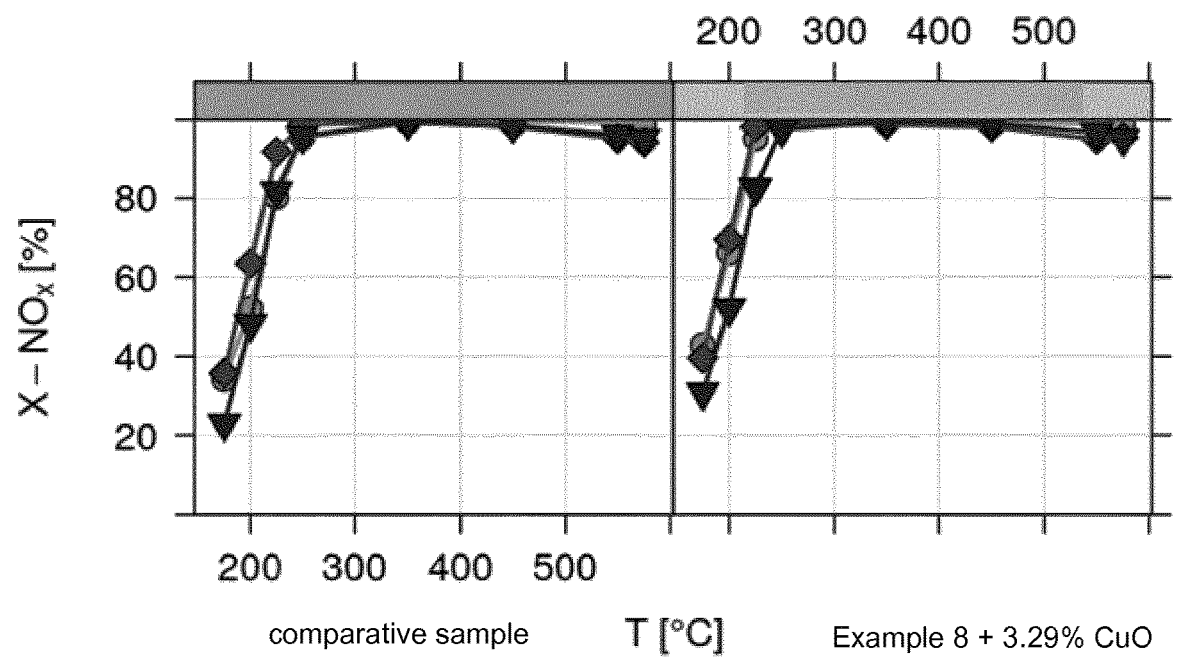
FIG. 10 displays results from SCR testing of Cu-CHA moldings from Example 8 according to Example 9, wherein the temperature in ° C. is shown along the abscissa, and the conversion rate of NOx in % is plotted along the ordinate. In the figure, the results for the fresh samples are indicated as "●", and the results for samples aged at 650° C. for 50 h are indicated as "♦", and the results for the samples aged at 820° C. for 16 h are indicated as "▼". Furthermore, the results from the SCR testing against a comparative sample are also shown.
Figure 11:
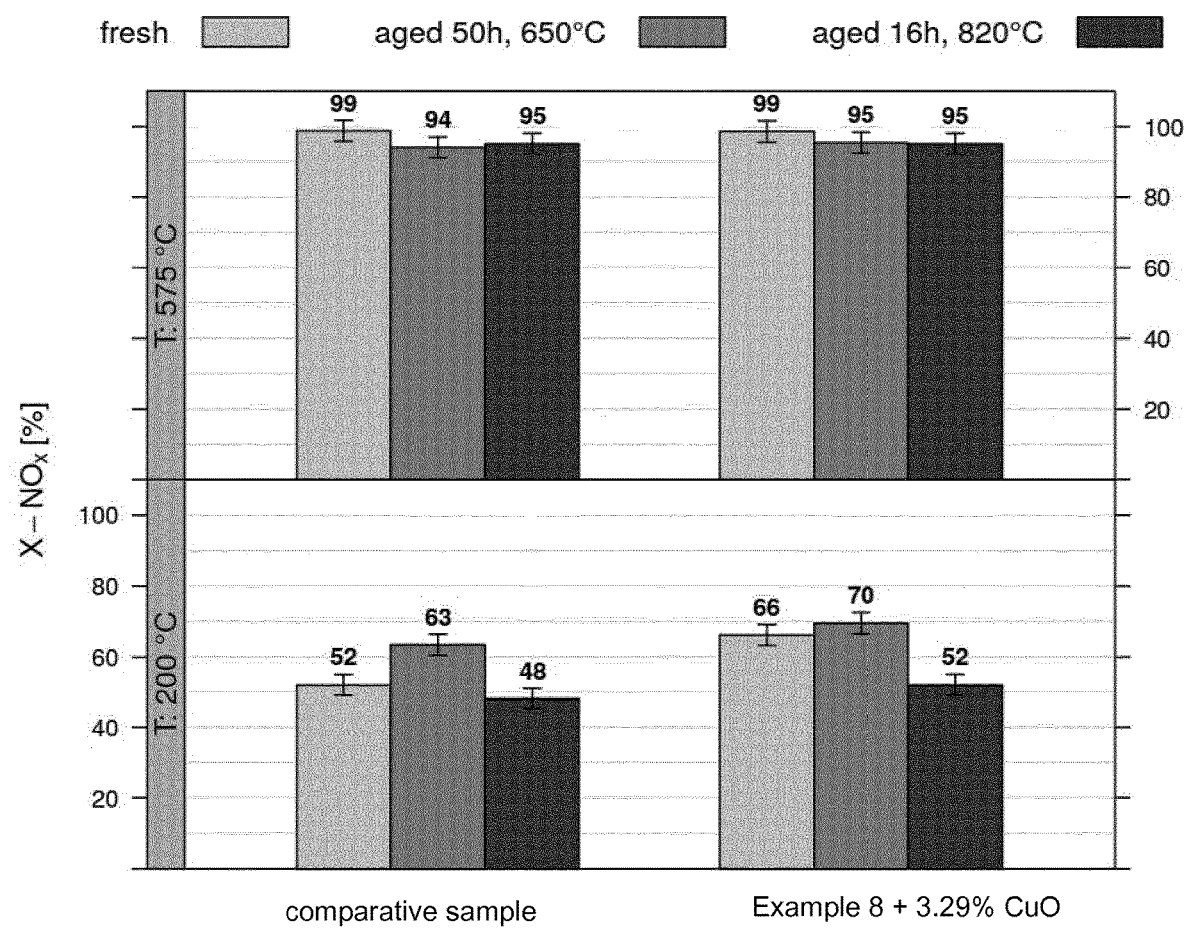
FIG. 11 displays as a bar chart the results from SCR testing of Cu-CHA moldings from Example 8 according to Example 9 against a comparative sample, showing the results for fresh, samples aged at 650° C. for 50 h, and samples aged at 820° C. for 16 h. As one can see, the bar chart indicates the results taken at 200° C. and 575° C. for each of the samples.

The SCR testing results are shown in FIGS. 10 and 11. As may be taken from the results for the inventive sample (Example 8), the Cu-CHA molded material shows excellent SCR activity over a broad temperature range, even after severe aging at 820° C.

In this light, compared to a standard reference Cu-CHA sample (prepared according to Example 1 of WO2015/185625 A2), the molded Cu-CHA from example 8 as shown by the SCR testing gave significantly advantageous results at low temperatures, even after aging at 650° C. and 820° C.

Comparative Example 1: Continuous Synthesis of a Zeolitic Material Having a CHA-Type Framework Structure with Calcined Seed Crystals Reference Example 2 was repeated, yet instead of employing the seed material from Reference Example 1, calcined seeds of a zeolitic material having the CHA-type framework structure were employed. When attempting to repeat the procedure of Example 1 using such a synthesis gel, however, the continuous synthesis could not be performed as long as the synthesis as described in Example 1 above due to the eventual clogging of the reactor tube.

Thus, it has surprisingly been found that by using a zeolitic material as seed crystals in the continuous synthesis of a zeolitic material, wherein the zeolitic material of the seed crystals contains cationic organotemplates at the ion exchange sites, the problem of clogging in the continuous synthesis may be effectively alleviated. As a result, continuous synthesis may be conducted for effectively longer periods of time before requiring interruption for maintenance of the apparatus used in the continuous synthesis.

List of cited prior art:
U.S. Pat. No. 5,989,518
US 2016/0115039 A1
Liu et al. in Angew. Chem. Int. Ed. 2015, 54, 5683-5687
Ju, J. et al. in Chemical Engineering Journal 2006, 116, 115-121
Vandermeersch, T. et al. in Microporous and Mesoporous Materials 2016, 226, 133-139
Liu, Z. et al. in Chemistry of Materials 2014, 26, 2327-2331
Slangen et al. "Continuous Synthesis of Zeolites using a Tubular Reactor", 12th International Zeolite Conference, Materials Research Society 1999
Bonaccorsi, L. et al. in Microporous and Mesoporous Materials 2008, 112, 481-493
US 2001/0054549 A1
DE 39 19 400 A1
WO 2017/216236 A
Hoang, P. H. et al. in J. Am. Chem. Soc. 2011, 133, 14765-14770
Nightingale, A. M. et al. in J. Mater. Chem. A, 2013, 1, 4067-4076
WO 2017/100384 A1
WO 2009/141324 A1

The invention claimed is:

1. A continuous process for preparing a zeolite material with a CHA-type framework structure comprising SiO$_2$ and X$_2$O$_3$, the process comprising:
   (i) preparing a mixture comprising one or more sources of SiO$_2$, one or more sources of X$_2$O$_3$, seed crystals, one or more tetraalkylammonium cation R$^5$R$^6$R$^7$R$^8$N$^+$-containing compounds as a structure directing agent, and a liquid solvent;
   (ii) continuously feeding the mixture prepared in (i) into a continuous flow reactor at a liquid hourly space velocity ranging from 0.3 h$^{-1}$ to 20 h$^{-1}$ for a duration of at least 1 h; and
   (iii) crystallizing the zeolite material with the CHA-type framework structure from the mixture in the continuous flow reactor, wherein the mixture is heated to a temperature ranging from 100° C. to 300° C. and wherein the volume of the continuous flow reactor ranges from 50 cm$^3$ to 75 m$^3$;
   wherein the seed crystals comprise one or more zeolite materials with one or more cationic organotemplates as counter-ions at the ion exchange sites of the framework structure;
   wherein X is a trivalent element;
   wherein each of R$^5$, R$^6$, and R$^7$ is independently chosen from one another and is an alkyl; and
   wherein R$^8$ is a cycloalkyl;
   wherein (a) a surface of the inner wall of the continuous flow reactor is lined with an organic polymer material, and/or
   (b) wherein the mixture constituting the feed crystallized in (iii) consists of a first liquid phase, a second liquid phase, and a solid phase comprising the seed crystals, wherein the first liquid phase comprises the liquid solvent and the second liquid phase comprises a lubricating agent, wherein the lubricating agent comprises one or more fluorinated compounds.

2. The process of claim 1, wherein the continuous flow reactor is chosen from a tubular reactor, a ring reactor, and a continuously oscillating reactor.

3. The process of claim 1, wherein in (iii) the mixture is heated under autogenous pressure.

4. The process of claim 1, wherein the process further comprises one or more of the following:
- (iv) quenching a reaction product effluent continuously upon exiting the reactor in step (iii) with a liquid comprising one or more solvents, via expansion of the reaction product effluent, or combinations thereof;
- (v) isolating the zeolite material obtained in step (iii) or step (iv);
- (vi) washing the zeolite material obtained in step (iii), step (iv) or step (v);
- (vii) drying the zeolite material obtained in step (iii), step (iv), step (v), or step (vi); and
- (viii) calcining the zeolite material obtained in step (iii), step (iv), step (v), step (vi), or step (vii).

5. The process of claim 1, wherein the one or more cationic organotemplates are chosen from tetraalkylammonium cations and mixtures thereof.

6. The process of claim 1, wherein X is chosen from Al, B, In, Ga, and combinations of two or more thereof.

7. The process of claim 1, wherein the mixture prepared in (i) and crystallized in (iii) further comprises one or more tetraalkylammonium cation $R^1R^2R^3R^4N^+$-containing compounds, wherein each of $R^1$, $R^2$, $R^3$, and $R^4$ is independently chosen from one another and is an alkyl.

8. The process of claim 4, wherein the process further comprises:
- (ix) subjecting the zeolite material obtained in (v), (vi), (vii), or (viii) to an ion-exchange procedure, wherein at least one ionic non-framework element or compound contained in the zeolite material is ion-exchanged against one or more metal ions.

9. The process of claim 8, wherein in (ix) the step of subjecting the zeolite material to an ion-exchange procedure comprises:
- (ix.a) subjecting the zeolite material obtained in (v), (vi), (vii), or (viii) to an ion-exchange procedure, wherein the at least one ionic non-framework element or compound contained in the zeolite material is ion-exchanged against $NH_4^+$;
- (ix.b) calcining the ion-exchanged zeolite material obtained in (ix.a) for obtaining the H-form of the zeolite material; and
- (ix.c) subjecting the zeolite material obtained in (ix.b) to the ion-exchange procedure, wherein $H^+$ contained in the zeolite material as ionic non-framework element is ion-exchanged against one or more metal ions.

10. The process of claim 9, wherein the one or more metal ions are chosen from ions of alkaline earth metal elements, transition metal elements, and combinations thereof.

11. A zeolite material obtained according to the process of claim 1.

12. The zeolite material according to claim 11, wherein the zeolite material is as a molecular sieve, an adsorbent for ion-exchange, a catalyst, a catalyst precursor, a catalyst support, and a catalyst support precursor.

* * * * *